United States Patent
Kasada et al.

(10) Patent No.: US 10,515,657 B2
(45) Date of Patent: Dec. 24, 2019

(54) MAGNETIC TAPE HAVING CHARACTERIZED MAGNETIC LAYER AND MAGNETIC RECORDING AND REPRODUCING DEVICE

(71) Applicant: FUJIFILM Corporation, Tokyo (JP)

(72) Inventors: Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/143,646

(22) Filed: Sep. 27, 2018

(65) Prior Publication Data

US 2019/0103130 A1    Apr. 4, 2019

(30) Foreign Application Priority Data

Sep. 29, 2017  (JP) .................................. 2017-191661
Sep. 12, 2018  (JP) .................................. 2018-170188

(51) Int. Cl.
*G11B 5/008*    (2006.01)
*G11B 5/706*    (2006.01)
(Continued)

(52) U.S. Cl.
CPC ............ *G11B 5/00813* (2013.01); *G11B 5/48* (2013.01); *G11B 5/70678* (2013.01);
(Continued)

(58) Field of Classification Search
CPC ..... G11B 5/70; G11B 5/3906; G11B 5/00813; G11B 5/39; G11B 5/8404; G11B 5/735;
(Continued)

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

Office Action dated Apr. 26, 2017 which issued during the prosecution of U.S. Appl. No. 15/388,864.

(Continued)

*Primary Examiner* — Brian E Miller
(74) *Attorney, Agent, or Firm* — Sughrue Mion, PLLC

(57) ABSTRACT

Provided are a magnetic tape, in which a magnetic layer includes a ferromagnetic powder, a binding agent, and an oxide abrasive, ΔSFD in a longitudinal direction of the magnetic tape calculated by Expression 1, $\Delta SFD = SFD_{25°\ C.} - SFD_{-190°\ C.}$, is equal to or smaller than 0.50, a logarithmic decrement acquired by a pendulum viscoelasticity test performed regarding a surface of the magnetic layer is equal to or smaller than 0.050, and an average particle diameter of the oxide abrasive obtained from a secondary ion image obtained by irradiating the surface of the magnetic layer with a focused ion beam is 0.04 μm to 0.08 μm, and a magnetic recording and reproducing device including this magnetic tape.

15 Claims, 4 Drawing Sheets

(51) Int. Cl.
*G11B 15/473* (2006.01)
*G11B 5/48* (2006.01)
*G11B 5/735* (2006.01)
*G11B 5/84* (2006.01)
*G11B 5/39* (2006.01)

(52) U.S. Cl.
CPC .......... *G11B 5/735* (2013.01); *G11B 5/8404* (2013.01); *G11B 15/473* (2013.01); *G11B 5/39* (2013.01); *G11B 2220/90* (2013.01)

(58) Field of Classification Search
CPC ..... G11B 15/473; G11B 5/70678; G11B 5/48; G11B 2220/90
See application file for complete search history.

(56) References Cited

U.S. PATENT DOCUMENTS

| | | |
|---|---|---|
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2* | 8/2004 | Masaki ............... G11B 5/70 428/336 |
| 6,791,803 B2 | 9/2004 | Saito et al. |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2* | 2/2006 | Masaki ............... G11B 5/70 428/842.8 |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,279,739 B2 | 10/2012 | Kanbe et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2* | 3/2017 | Kasada ................ G11B 5/78 |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1* | 5/2018 | Kaneko ............ G11B 5/00826 |
| 9,978,414 B1 | 5/2018 | Kaneko et al. |
| 9,984,710 B2* | 5/2018 | Kasada ................ G11B 5/68 |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2* | 7/2018 | Kasada ................ G11B 5/78 |
| 10,062,403 B1* | 8/2018 | Kasada ................ G11B 5/70 |
| 10,074,393 B2 | 9/2018 | Kaneko et al. |
| 10,134,433 B2* | 11/2018 | Kasada ................ G11B 5/70 |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1* | 8/2006 | Harasawa ............ G11B 5/70 360/319 |
| 2006/0232883 A1 | 10/2006 | Biskeborn et al. |
| 2007/0009769 A1 | 1/2007 | Kanazawa |
| 2007/0020489 A1* | 1/2007 | Yamazaki ............ B82Y 30/00 428/842.8 |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |

(56) References Cited

U.S. PATENT DOCUMENTS

| | | | |
|---|---|---|---|
| 2010/0073816 A1* | 3/2010 | Komori | G11B 5/00821 360/110 |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 | 2/2012 | Tanaka et al. | |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1 | 8/2012 | Suzuki | |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura et al. | |
| 2013/0084470 A1 | 4/2013 | Hattori et al. | |
| 2013/0088794 A1 | 4/2013 | Cherubini et al. | |
| 2013/0256584 A1 | 10/2013 | Yamazaki et al. | |
| 2013/0260179 A1 | 10/2013 | Kasada et al. | |
| 2013/0279040 A1 | 10/2013 | Cideciyan et al. | |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1 | 3/2016 | Ashida et al. | |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1* | 2/2017 | Oyanagi | G11B 5/70 |
| 2017/0053671 A1* | 2/2017 | Kasada | G11B 5/78 |
| 2017/0058227 A1 | 3/2017 | Kondo et al. | |
| 2017/0092315 A1 | 3/2017 | Ozawa et al. | |
| 2017/0130156 A1 | 5/2017 | Kondo et al. | |
| 2017/0178675 A1 | 6/2017 | Kasada | |
| 2017/0178676 A1 | 6/2017 | Kasada | |
| 2017/0178677 A1 | 6/2017 | Kasada | |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1 | 8/2017 | Oyanagi et al. | |
| 2017/0221517 A1 | 8/2017 | Ozawa et al. | |
| 2017/0249963 A1 | 8/2017 | Oyanagi et al. | |
| 2017/0249964 A1 | 8/2017 | Kasada et al. | |
| 2017/0249965 A1 | 8/2017 | Kurokawa et al. | |
| 2017/0249966 A1 | 8/2017 | Tachibana et al. | |
| 2017/0287517 A1 | 10/2017 | Hosoya et al. | |
| 2017/0337944 A1 | 11/2017 | Biskeborn et al. | |
| 2017/0355022 A1 | 12/2017 | Kaneko et al. | |
| 2017/0358318 A1 | 12/2017 | Kasada et al. | |
| 2017/0372726 A1 | 12/2017 | Kasada et al. | |
| 2017/0372727 A1 | 12/2017 | Kasada et al. | |
| 2017/0372736 A1 | 12/2017 | Kaneko et al. | |
| 2017/0372737 A1 | 12/2017 | Oyanagi et al. | |
| 2017/0372738 A1 | 12/2017 | Kasada | |
| 2017/0372739 A1 | 12/2017 | Ozawa et al. | |
| 2017/0372740 A1 | 12/2017 | Ozawa et al. | |
| 2017/0372741 A1 | 12/2017 | Kurokawa et al. | |
| 2017/0372742 A1 | 12/2017 | Kaneko et al. | |
| 2017/0372743 A1 | 12/2017 | Kasada et al. | |
| 2017/0372744 A1 | 12/2017 | Ozawa et al. | |
| 2018/0061446 A1 | 3/2018 | Kasada | |
| 2018/0061447 A1 | 3/2018 | Kasada | |
| 2018/0082710 A1 | 3/2018 | Tada et al. | |
| 2018/0137887 A1 | 5/2018 | Sekiguchi et al. | |
| 2018/0182417 A1 | 6/2018 | Kaneko et al. | |
| 2018/0182422 A1 | 6/2018 | Kawakami et al. | |
| 2018/0182425 A1 | 6/2018 | Kasada et al. | |
| 2018/0182426 A1 | 6/2018 | Ozawa et al. | |
| 2018/0182427 A1 | 6/2018 | Kasada et al. | |
| 2018/0182428 A1 | 6/2018 | Kasada et al. | |
| 2018/0182429 A1 | 6/2018 | Kasada et al. | |
| 2018/0182430 A1 | 6/2018 | Ozawa et al. | |
| 2018/0240475 A1 | 8/2018 | Kasada | |
| 2018/0240476 A1 | 8/2018 | Kasada et al. | |
| 2018/0240478 A1 | 8/2018 | Kasada et al. | |
| 2018/0240479 A1* | 8/2018 | Kasada | G11B 5/3909 |
| 2018/0240481 A1 | 8/2018 | Kasada et al. | |
| 2018/0240488 A1 | 8/2018 | Kasada | |
| 2018/0240489 A1* | 8/2018 | Kasada | G11B 5/70 |
| 2018/0240490 A1 | 8/2018 | Kurokawa et al. | |
| 2018/0240491 A1 | 8/2018 | Ozawa et al. | |
| 2018/0240492 A1* | 8/2018 | Kasada | G11B 5/735 |
| 2018/0240493 A1* | 8/2018 | Tada | G11B 5/712 |
| 2018/0240494 A1 | 8/2018 | Kurokawa et al. | |
| 2018/0240495 A1* | 8/2018 | Kasada | G11B 5/712 |
| 2018/0286439 A1 | 10/2018 | Ozawa et al. | |
| 2018/0286442 A1 | 10/2018 | Ozawa et al. | |
| 2018/0286443 A1 | 10/2018 | Ozawa et al. | |
| 2018/0286444 A1 | 10/2018 | Kasada et al. | |
| 2018/0286446 A1 | 10/2018 | Ozawa et al. | |
| 2018/0286447 A1 | 10/2018 | Ozawa et al. | |
| 2018/0286448 A1 | 10/2018 | Ozawa et al. | |
| 2018/0286449 A1 | 10/2018 | Kasada et al. | |
| 2018/0286450 A1 | 10/2018 | Kasada et al. | |
| 2018/0286451 A1 | 10/2018 | Ozawa et al. | |
| 2018/0286452 A1 | 10/2018 | Ozawa et al. | |
| 2018/0286453 A1 | 10/2018 | Kasada et al. | |
| 2018/0301165 A1 | 10/2018 | Oyanagi et al. | |
| 2018/0350398 A1 | 12/2018 | Kawakami et al. | |
| 2018/0350400 A1 | 12/2018 | Kaneko et al. | |
| 2018/0358042 A1 | 12/2018 | Kasada et al. | |
| 2018/0374507 A1 | 12/2018 | Kasada | |
| 2019/0027167 A1 | 1/2019 | Tada et al. | |
| 2019/0027168 A1 | 1/2019 | Kasada et al. | |
| 2019/0027171 A1 | 1/2019 | Kasada | |
| 2019/0027172 A1 | 1/2019 | Kasada | |
| 2019/0027174 A1 | 1/2019 | Tada et al. | |
| 2019/0027175 A1 | 1/2019 | Kurokawa et al. | |
| 2019/0027176 A1 | 1/2019 | Kurokawa et al. | |
| 2019/0027177 A1 | 1/2019 | Kasada | |
| 2019/0027178 A1 | 1/2019 | Kasada | |
| 2019/0027179 A1 | 1/2019 | Ozawa et al. | |
| 2019/0027180 A1* | 1/2019 | Kasada | G11B 5/735 |
| 2019/0027181 A1 | 1/2019 | Ozawa et al. | |
| 2019/0035424 A1 | 1/2019 | Endo | |
| 2019/0051325 A1 | 2/2019 | Kasada et al. | |
| 2019/0088278 A1 | 3/2019 | Kasada et al. | |
| 2019/0096437 A1 | 3/2019 | Ozawa et al. | |
| 2019/0103131 A1* | 4/2019 | Kasada | G11B 5/00813 |
| 2019/0103133 A1 | 4/2019 | Ozawa et al. | |
| 2019/0103134 A1 | 4/2019 | Kasada et al. | |
| 2019/0103135 A1 | 4/2019 | Ozawa et al. | |
| 2019/0130936 A1 | 5/2019 | Kaneko et al. | |

(56) References Cited

U.S. PATENT DOCUMENTS

| | | | |
|---|---|---|---|
| 2019/0259416 A1 | 8/2019 | Kawakami et al. | |
| 2019/0295590 A1 | 9/2019 | Kaneko et al. | |

FOREIGN PATENT DOCUMENTS

| | | | |
|---|---|---|---|
| JP | 61-11924 A | 1/1986 | |
| JP | 61-139923 A | 6/1986 | |
| JP | 61-139932 A | 6/1986 | |
| JP | 63-129519 A | 6/1988 | |
| JP | 63-249932 A | 10/1988 | |
| JP | 64-057422 A | 3/1989 | |
| JP | 64-60819 A | 3/1989 | |
| JP | 5-258283 A | 10/1993 | |
| JP | 5-298653 A | 11/1993 | |
| JP | 7-57242 A | 3/1995 | |
| JP | 11-110743 A | 4/1999 | |
| JP | 11-175949 A | 7/1999 | |
| JP | 11-273051 A | 10/1999 | |
| JP | 2000-251240 A | 9/2000 | |
| JP | 2002-157726 A | 5/2002 | |
| JP | 2002-329605 A | 11/2002 | |
| JP | 2002-367142 A | 12/2002 | |
| JP | 2002-367318 A | 12/2002 | |
| JP | 2003-77116 A | 3/2003 | |
| JP | 2003-323710 A | 11/2003 | |
| JP | 2004-005820 A | 1/2004 | |
| JP | 2004-114492 A | 4/2004 | |
| JP | 2004-133997 A | 4/2004 | |
| JP | 2004-185676 A | 7/2004 | |
| JP | 2005-38579 A | 2/2005 | |
| JP | 2005-092967 A | 4/2005 | |
| JP | 2005-243063 A | 9/2005 | |
| JP | 2005-243162 A | 9/2005 | |
| JP | 2006-92672 A | 4/2006 | |
| JP | 2006-286114 A | 10/2006 | |
| JP | 2007-265555 A | 10/2007 | |
| JP | 2007-273039 A | 10/2007 | |
| JP | 2007-287310 A | 11/2007 | |
| JP | 2007-297427 A | 11/2007 | |
| JP | 2008-047276 A | 2/2008 | |
| JP | 2008-243317 A | 10/2008 | |
| JP | 2009-283082 A | 12/2009 | |
| JP | 2010-036350 A | 2/2010 | |
| JP | 2010-049731 A | 3/2010 | |
| JP | 2011-48878 A | 3/2011 | |
| JP | 2011-138566 A | 7/2011 | |
| JP | 2011-210288 A | 10/2011 | |
| JP | 2011-225417 A | 11/2011 | |
| JP | 2012-38367 A | 2/2012 | |
| JP | 2012-043495 A | 3/2012 | |
| JP | 2012-203955 A | 10/2012 | |
| JP | 2013-25853 A | 2/2013 | |
| JP | 2013-77360 A | 4/2013 | |
| JP | 2013-164889 A | 8/2013 | |
| JP | 2014-15453 A | 1/2014 | |
| JP | 2014-179149 A | 9/2014 | |
| JP | 2015-39801 A | 3/2015 | |
| JP | 2015-111484 A | 6/2015 | |
| JP | 2016-15183 A | 1/2016 | |
| JP | 2016-502224 A | 1/2016 | |
| JP | 2016-051493 A | 4/2016 | |
| JP | 2016-71926 A | 5/2016 | |
| JP | 2016-139451 A | 8/2016 | |

OTHER PUBLICATIONS

Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No, 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
"Introduction to TMR Magnetic Sensors", Anonymous, Mar. 12, 2015, MR Sensor Technology, pp. 1-4 (Year: 2015).

* cited by examiner

MAGNETIC TAPE HAVING CHARACTERIZED MAGNETIC LAYER AND MAGNETIC RECORDING AND REPRODUCING DEVICE

CROSS-REFERENCE TO RELATED APPLICATIONS

This application claims priority under 35 U.S.C 119 to Japanese Patent Application No. 2017-191661 filed on Sep. 29, 2017 and Japanese Patent Application No. 2018-170188 filed on Sep. 12, 2018. Each of the above applications is hereby expressly incorporated by reference, in its entirety, into the present application.

BACKGROUND OF THE INVENTION

1. Field of the Invention

The present invention relates to a magnetic tape and a magnetic recording and reproducing device.

2. Description of the Related Art

Magnetic recording media are divided into tape-shaped magnetic recording media and disk-shaped magnetic recording media, and tape-shaped magnetic recording media, that is, magnetic tapes are mainly used for data storage. The recording and/or reproducing of information with respect to a magnetic tape is generally performed by bringing a surface of a magnetic tape (surface of magnetic layer) into contact with a magnetic head (hereinafter, also referred to as a "head") and sliding.

One performance required from the magnetic tape is to exhibit excellent electromagnetic conversion characteristics in a case of reproducing information recorded on the magnetic tape.

Meanwhile, in a case where chipping of a reproducing element of the head occurs due to the sliding between the surface of the magnetic layer and the head (hereinafter, also referred to as "head element chipping"), a distance between the surface of the magnetic layer and the reproducing element increases and spacing loss which is a reason of a deterioration of electromagnetic conversion characteristics may occur. As the countermeasure for preventing the occurrence of this spacing loss, a technology of providing a protective layer on the head has been proposed in the related art (for example, see JP2005-92967A).

SUMMARY OF THE INVENTION

However, data recorded on various recording media such as a magnetic tape is called hot data, warm data, and cold data depending on access frequencies (reproducing frequencies). The access frequencies decrease in the order of hot data, warm data, and cold data, and it is general that the cold data is stored as being recorded on a recording medium for a long period of time which is longer than 10 years (for example, several tens of years). The recording and storing of the cold data as described above is referred to as "archive". The data amount of the cold data recorded and stored on a magnetic recording medium increases in accordance with a dramatic increase in information contents and digitization of various information in recent years, and accordingly, a magnetic recording and reproducing system suitable for the archive is gaining attention.

In such a circumstance, a green tape test (GTT) is performed as a test for a magnetic recording and reproducing device (generally referred to as a "drive"). In the GTT, a particular use aspect for archive, in which cold data having a low access frequency is recorded and reproducing, is assumed, and a plurality of (for example, several hundreds of) new (unused) magnetic tapes are slid with respect to one head while changing the magnetic tapes. Meanwhile, in a head durability test in the related art, a use aspect with a high access frequency compared to the archive purpose has been assumed, and accordingly, one magnetic tape is normally repeatedly slid on the same magnetic head, without changing the magnetic tape to a new product. In such a durability test in the related art, a surface of a magnetic layer is worn while repeating the sliding, and thus, the head element chipping gradually becomes to hardly occur. With respect to this, in the GTT, the same head is repeatedly slid on a plurality of new magnetic tape by changing the magnetic tape slid on the head to a new product, and thus, the head is in a severe condition where the chipping significantly easily occurs, compared to the durability test in the related art. In order to prevent such head element chipping in the GTT, the countermeasure on the head side and the countermeasure on the magnetic tape side have been considered. For example, as the countermeasure on the head side, an increase in thickness of a protective layer of the head has been considered, but an increase in thickness of the protective layer of the head causes an increase in distance between the surface of the magnetic layer and the reproducing element of the head, and this may cause spacing loss. With respect to this, in a case where the countermeasure on the magnetic tape side for preventing the head element chipping in the GTT can be found, a magnetic tape with such a countermeasure may be a magnetic tape suitable for a recording medium for archive, in which head element chipping hardly occurs in a use aspect for archive.

Therefore, an aspect of the invention provides for a magnetic tape suitable for a recording medium for archive capable of exhibiting excellent electromagnetic conversion characteristics, specifically, a magnetic tape capable of exhibiting excellent electromagnetic conversion characteristics and preventing occurrence of head element chipping in a green tape test (GTT).

According to an aspect of the invention, there is provided a magnetic tape comprising: a non-magnetic support; and a magnetic layer including a ferromagnetic powder and a binding agent on the non-magnetic support, in which ΔSFD in a longitudinal direction of the magnetic tape calculated by Expression 1 (hereinafter, also simply referred to as "ΔSFD") is equal to or smaller than 0.50, $$\Delta SFD = SFD_{25°\,C.} - SFD_{-190°\,C.} \qquad \text{Expression 1,}$$

in Expression 1, the $SFD_{25°\,C.}$ is a switching field distribution SFD measured in the longitudinal direction of the magnetic tape at a temperature of 25° C., and the $SFD_{-190°\,C.}$ is a switching field distribution SFD measured in the longitudinal direction of the magnetic tape at a temperature of −190° C., the magnetic layer includes an oxide abrasive, a logarithmic decrement acquired by a pendulum viscoelasticity test performed regarding a surface of the magnetic layer (hereinafter, also referred to as a "logarithmic decrement of the magnetic layer surface" or simply a "logarithmic decrement") is equal to or smaller than 0.050, and an average particle diameter of the oxide abrasive obtained from a secondary ion image obtained by irradiating the surface of the magnetic layer with a focused ion beam (FIB) (hereinafter, also referred to as a "FIB abrasive diameter") is 0.04 μm to 0.08 μm.

In one aspect, the logarithmic decrement may be 0.010 to 0.050.

In one aspect, the ΔSFD may be 0.03 to 0.50.

In one aspect, the ferromagnetic powder may be a ferromagnetic hexagonal ferrite powder.

In one aspect, the oxide abrasive may be an alumina powder.

In one aspect, the magnetic tape may further comprise a non-magnetic layer including a non-magnetic powder and a binding agent between the non-magnetic support and the magnetic layer.

In one aspect, the magnetic tape may further comprise a back coating layer including a non-magnetic powder and a binding agent on a surface of the non-magnetic support opposite to a surface provided with the magnetic layer.

According to another aspect of the invention, there is provided a magnetic recording and reproducing device comprising: the magnetic tape; and a magnetic head.

In one aspect, the magnetic head may be a magnetic head including magnetoresistive (MR) element.

According to one aspect of the invention, it is possible to provide a magnetic tape suitable for archive use, which is capable of exhibiting excellent electromagnetic conversion characteristics and preventing occurrence of head element chipping in a green tape test (GTT), and a magnetic recording and reproducing device including this magnetic tape.

DESCRIPTION OF THE PREFERRED EMBODIMENTS

Magnetic Tape

Figure 1:
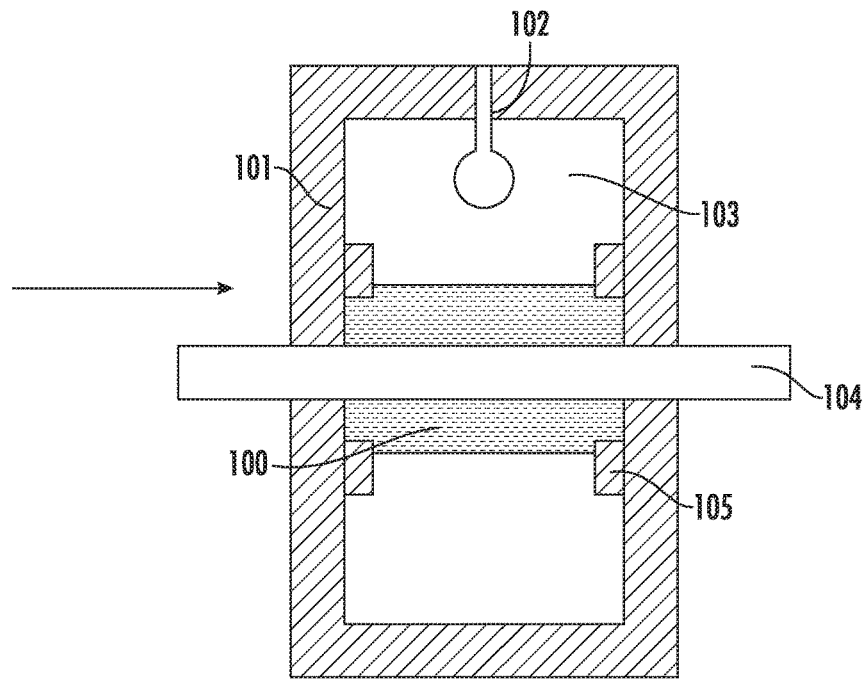
FIG. 1 is an explanatory diagram of a measurement method of a logarithmic decrement.

One aspect of the invention relates to a magnetic tape including: a non-magnetic support; and a magnetic layer including a ferromagnetic powder and a binding agent, in which $\Delta$SFD in a longitudinal direction of the magnetic tape calculated by Expression 1 is equal to or smaller than 0.50, the magnetic layer includes an oxide abrasive, a logarithmic decrement acquired by a pendulum viscoelasticity test performed regarding a surface of the magnetic layer is equal to or smaller than 0.050, and an average particle diameter of the oxide abrasive obtained from a secondary ion image obtained by irradiating the surface of the magnetic layer with a focused ion beam (FIB abrasive diameter) is 0.04 µm to 0.08 µm.

In the invention and the specification, the "surface of the magnetic layer" is identical to the surface of the magnetic tape on the magnetic layer side. In the invention and the specification, the "ferromagnetic powder" means an aggregate of a plurality of ferromagnetic particles. The "aggregate" not only includes an aspect in which particles configuring the aggregate are directly in contact with each other, but also includes an aspect in which a binding agent or an additive is interposed between the particles. The points described above are also applied to various powders such as non-magnetic powder of the invention and the specification, in the same manner.

In the invention and the specification, the "oxide abrasive" means a non-magnetic oxide powder having Mohs hardness exceeding 8.

In the invention and the specification, the description regarding directions and angles (for example, vertical, orthogonal, parallel, and the like) includes a range of errors allowed in the technical field of the invention, unless otherwise noted. For example, the range of errors means a range of less than ±10° from an exact angle, and is preferably within ±5° and more preferably within ±3° from an exact angle.

A surmise of the inventors regarding the magnetic tape is as follows.

The inventors have thought that the $\Delta$SFD of the magnetic tape equal to or smaller than 0.50 mainly contributes to making the magnetic tape to be capable of exhibiting excellent electromagnetic conversion characteristics. Specifically, it is thought that the $\Delta$SFD is a value which may be an index for a state of ferromagnetic powder present in the magnetic layer. It is surmised that, a state in which the $\Delta$SFD is equal to or smaller than 0.50 is a state in which particles of ferromagnetic powder is suitably aligned and present in the magnetic layer, and such a state contributes to the reproducing of information recorded on the magnetic tape at a high signal-to-noise-ratio (SNR).

In addition, the inventors have thought that, the logarithmic decrement of the magnetic layer surface and the FIB abrasive diameter in the magnetic tape set to be in the respective ranges described above mainly contribute to prevention of occurrence of the head element chipping in the GTT. This point will be further described hereinafter.

In the invention and the specification, the logarithmic decrement of the magnetic layer surface is a value acquired by the following method.

Figure 2:
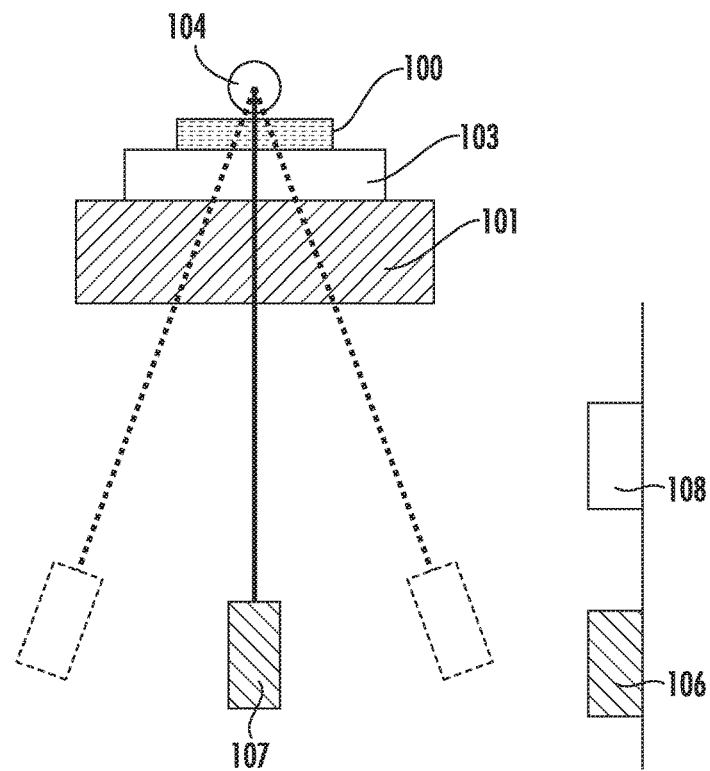
FIG. 2 is an explanatory diagram of the measurement method of the logarithmic decrement.
Figure 3:
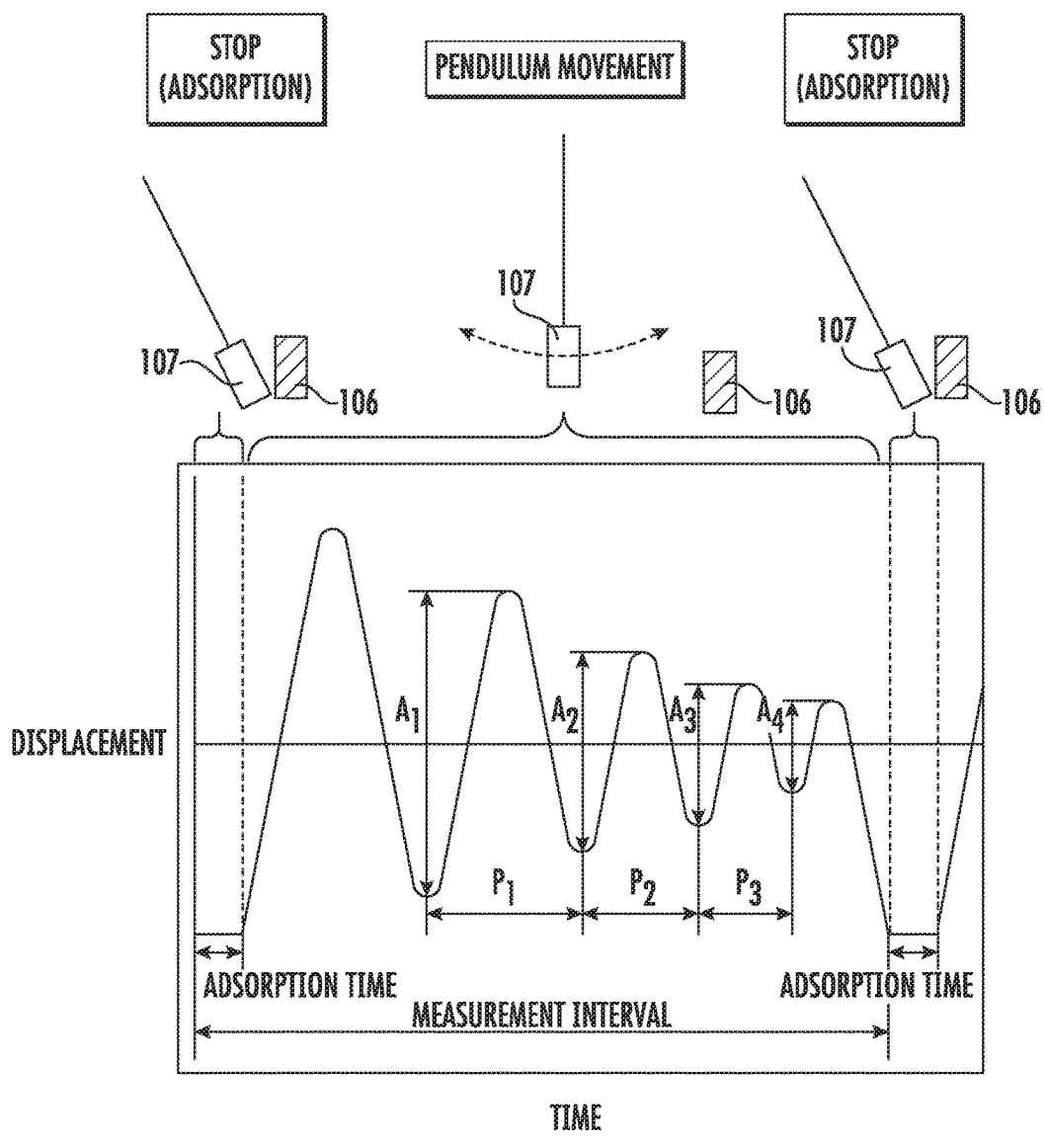
FIG. 3 is an explanatory diagram of the measurement method of the logarithmic decrement.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A portion of the magnetic tape which is a measurement target (a measurement sample) 100 is placed on a substrate 103 so that a measurement surface (surface of the magnetic layer) faces upwards and the measurement sample 100 is fixed by, for example, fixing tapes 105 in a state where obvious wrinkles which can be visually confirmed are not generated, in a sample stage 101 in a pendulum viscoelasticity tester.

A pendulum-attached round-bar type cylinder edge 104 is loaded on the measurement surface of the measurement sample 100 so that a long axis direction of the cylinder edge becomes parallel to a longitudinal direction of the measurement sample 100. An example of a state in which the pendulum-attached round-bar type cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is the same direction as a longitudinal direction of a magnetic tape from which the measurement sample is cut out. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (any rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement Δ(no unit) is acquired from the following Expression by using a displacement-time curve obtained in the measurement interval after 10 minutes or longer (may be any time, as long as it is 10 minutes or longer) has elapsed, and this value is set as logarithmic decrement of the surface of the magnetic layer of the magnetic tape. The adsorption time of the first adsorption is set as 1 second or longer (may be any time, as long as it is 1 second or longer), and the interval between the adsorption stop and the adsorption start is set as 6 seconds or longer (may be any time, as long as it is 6 seconds or longer). The measurement interval is an interval of the time from the adsorption start and the next adsorption start. In addition, humidity of an environment in which the pendulum movement is performed, may be any relative humidity, as long as the relative humidity is 40% to 70%. Temperature of an environment in which the pendulum movement is performed, may be random temperature, as long as the temperature is 20° C. to 30° C.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

It is thought that the logarithmic decrement is a value which is an index for the amount of pressure sensitive adhesive components separated from the surface of the magnetic layer, in a case where the head comes into contact with the surface of the magnetic layer and slides thereon, and interposed between the surface of the magnetic layer and the head. It is thought that as a larger amount of the pressure sensitive adhesive components is present, adhesiveness between the surface of the magnetic layer and the head increases, and this disturbs smooth sliding between the surface of the magnetic layer and the head (sliding properties are deteriorated). With respect to this, it is thought that, in the magnetic tape, a state where the logarithmic decrement of the magnetic layer surface is equal to or smaller than 0.050, that is, a state where the amount of the pressure sensitive adhesive components is decreased contributes to smooth sliding between the surface of the magnetic layer and the head. As a result, the inventors have surmised that it is possible to prevent the chipping of the head element due to the sliding on the surface of the magnetic layer in GTT.

The details of the pressure sensitive adhesive components are not clear. The inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have thought that the binding agent component having a low molecular weight may be separated from the surface of the magnetic layer at the time of sliding between the head and the surface of the magnetic layer and interposed between the surface of the magnetic layer and the head. The inventors have surmised that, the binding agent component having a low molecular weight may have pressure sensitive adhesive properties and the logarithmic decrement acquired by a pendulum viscoelasticity test may be an index for the amount of binding agent components having a low molecular weight separated from the surface of the magnetic layer at the time of the sliding between the surface of the magnetic layer and the head. In one aspect, the magnetic layer is formed by applying a magnetic layer forming composition including a curing agent in addition to ferromagnetic powder, a binding agent, and an oxide abrasive, onto a non-magnetic support directly or with another layer interposed therebetween, and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the magnetic layer and is easily separated from the magnetic layer may be one of reasons for that the binding agent component having a low molecular weight is interposed between the surface of the magnetic layer and the head at the time of the sliding between the surface of the magnetic layer and the head.

In the invention and the specification, the FIB abrasive diameter is a value obtained by the following method.

(1) Obtaining Secondary Ion Image

A secondary ion image of a region, having a size of 25 μm×25 μm, of the surface of the magnetic layer of the magnetic recording medium which is a target for obtaining the FIB abrasive diameter is obtained by a focused ion beam device. As the focused ion beam device, MI4050 manufactured by Hitachi High-Technologies Corporation can be used.

Beam irradiation conditions of the focused ion beam device in a case of obtaining the secondary ion image are set so that an acceleration voltage is 30 kV, a current value is 133 pA (picoampere), a beam size is 30 nm, and a brightness is 50%. A coating process with respect to a surface of a magnetic layer before the imaging is not performed. A secondary ion (SI) signal is detected by a secondary ion detector and a secondary ion image is captured. Conditions for capturing a secondary ion image are determined by the following method. ACB (auto contrast brightness) is carried out at three spots on a non-imaged region of the surface of the magnetic layer (i.e., ACB is carried out three times) to stabilize a color of the image. Then, the contrast reference value and the brightness reference value are determined. The brightness reference value as determined in the above ACB and the contrast value which is lowered by 1% from the contrast reference value as determined in the above ACB are determined as the conditions for capturing a secondary ion image. A non-imaged region of the surface of the magnetic layer is selected, and a secondary ion image is captured under the conditions for capturing as determined above. A portion for displaying a size and the like (micron bar, cross mark, and the like) is removed from the captured image, and a secondary ion image having the pixel number of 2,000 pixel×2,000 pixel is obtained. For specific examples of the imaging conditions, examples which will be described later can be referred to.

(2) Calculation of FIB Abrasive Diameter

The secondary ion image obtained in (1) is put into image processing software, and a binarization process is performed by the following procedure. As the image analysis software, ImageJ which is free software can be used, for example.

A tone of the secondary ion image obtained in (1) is changed to 8 bit. Regarding threshold values for the binarization process, a lower limit value is set as 250 gradations, an upper limit value is set as 255 gradations, and the binarization process is executed by these two threshold values. After the binarization process, a noise component removal process is performed by the image analysis software. The noise component removal process can be carried out, for example, by the following method. On the image analysis software, ImageJ, a noise cut process Despeckle is selected, and Size 4.0-Infinity is set on AnalyzeParticle to remove noise components.

Each white-shining portion in the binarization process image obtained as described above is determined as an oxide abrasive, and the number of white-shining portions is obtained by the image analysis software, and the area of the white-shining portion is obtained. An equivalent circle diameter of each portion is obtained from the area of the white-shining portion obtained here. Specifically, an equivalent circle diameter L is calculated from the obtained area A by $(A/\pi)^{(1/2)} \times 2 = L$.

The above step is performed four times at different portions (25 μm×25 μm) of the surface of the magnetic layer of the magnetic recording medium which is a target for obtaining the FIB abrasive diameter, and the FIB abrasive diameter is calculated from the obtained results by an expression; FIB abrasive diameter=$\Sigma(Li)/\Sigma i$. $\Sigma i$ is a total number of the white-shining portions observed in the binarization process image obtained by performing the above step four times. $\Sigma(Li)$ is a total of the equivalent circle diameters L obtained regarding the white-shining portions observed in the binarization process image obtained by performing the above step four times. Regarding the white-shining portion, only a part of the portion may be included in the binarization process image. In such a case, $\Sigma i$ and $\Sigma(Li)$ are obtained without including the part.

The FIB abrasive diameter is a value which can be an index of a presence state of an oxide abrasive in the magnetic layer, and is obtained from the secondary ion image obtained by irradiating the surface of the magnetic layer with a focused ion beam (FIB). This secondary ion image is generated by capturing secondary ion generated from the surface of the magnetic layer irradiated with the FIB. Meanwhile, as an observation method of the presence state of the abrasive in the magnetic layer, a method using a scanning electron microscope (SEM) has been proposed in the related art. By the SEM, the surface of the magnetic layer is irradiated with an electron beam and secondary electrons emitted from the surface of the magnetic layer are captured to generate an image (SEM image). Even in a case where the same magnetic layer is observed, a size of the oxide abrasive obtained from the secondary ion image and a size of the oxide abrasive obtained from the SEM image are different from each other due to a difference of such image generation principle. As a result of intensive studies of the inventors, a presence state of the oxide abrasive in the magnetic layer is controlled so that the FIB abrasive diameter becomes 0.04 μm to 0.08 μm, by setting the FIB abrasive diameter obtained from the secondary ion image by the method described above as a new index of the presence state of the oxide abrasive in the magnetic layer. The inventors have thought that the controlling of the presence state of the oxide abrasive in the magnetic layer as described above also contributes to prevention of chipping of the head element due to the sliding on the surface of the magnetic layer in the GTT.

The inventors have surmised that, as described above, excellent electromagnetic conversion characteristics exhibited by the magnetic tape mainly contributes to the setting of the $\Delta$SFD to be in the range described above, and the prevention of the occurrence of the head element chipping in the GTT mainly contributes to the setting of the logarithmic decrement of the magnetic layer surface and the FIB abrasive diameter to be in the ranges described above. However, the invention is not limited to the surmise described above.

Hereinafter, the magnetic tape is described more specifically.

$\Delta$SFD

In the magnetic tape, the $\Delta$SFD in a longitudinal direction of the magnetic tape calculated by Expression 1 is equal to or smaller than 0.50. It is thought that the $\Delta$SFD is a value which may be an index showing a state of ferromagnetic powder present in the magnetic layer. Specifically, it is thought that, as a value of the ΔSFD is small, particles of the ferromagnetic powder are aligned by strong interaction. It is surmised that, a state where the ΔSFD is equal to or smaller than 0.50 is a state where particles of the ferromagnetic powder are suitably aligned and present in the magnetic layer, and such a state contributes to improvement of electromagnetic conversion characteristics. From a viewpoint of further increasing electromagnetic conversion characteristics, the ΔSFD is preferably equal to or smaller than 0.48, more preferably equal to or smaller than 0.45, even more preferably equal to or smaller than 0.40, still more preferably equal to or smaller than 0.35, and still even more preferably equal to or smaller than 0.30. In addition, from a viewpoint of further more increasing the SNR, the ΔSFD is preferably equal to or greater than 0.03, more preferably equal to or greater than 0.05, and even more preferably equal to or greater than 0.10.

The SFD in a longitudinal direction of the magnetic tape can be measured by using a well-known magnetic properties measurement device such as a vibration sample magnetometer. The same applies to the measurement of the SFD of the ferromagnetic powder. In addition, a measurement temperature of the SFD can be adjusted by setting the measurement device.

According to the studies of the inventors, the ΔSFD calculated by Expression 1 can be controlled by a preparation method of the magnetic tape, and mainly the following tendencies were seen:

(A) the value decreases, as dispersibility of ferromagnetic powder in the magnetic layer increases;

(B) the value decreases, as ferromagnetic powder having small temperature dependency of SFD is used as the ferromagnetic powder; and (C) the value decreases, as the particles of the ferromagnetic powder are aligned in a longitudinal direction of the magnetic layer (as a degree of alignment in a longitudinal direction increases), and the value increases, as a degree of alignment in a longitudinal direction decreases.

For example, regarding (A), dispersion conditions are reinforced (an increase in dispersion time, a decrease in diameter and/or an increase in degree of filling of dispersion beads used in the dispersion, and the like), and a dispersing agent is used. As a dispersing agent, a well-known dispersing agent or a commercially available dispersing agent can be used.

Meanwhile, regarding (B), as an example, ferromagnetic powder in which a difference $\Delta SFD_{powder}$ between SFD of the ferromagnetic powder measured at a temperature of 100° C. and SFD thereof measured at a temperature of 25° C., which are calculated by Expression 2 is 0.05 to 1.50, can be used, for example. However, even in a case where the difference $\Delta SFD_{powder}$ is not in the range described above, it is possible to control the ΔSFD of the magnetic tape calculated by Expression 1 to be equal to or smaller than 0.50 by other controlling methods.

$$\Delta SFD_{powder} = SFD_{powder 100° C.} - SFD_{powder 25° C.} \quad \text{Expression 2}$$

(In Expression 2, the $SFD_{powder 100° C.}$ is a switching field distribution SFD of ferromagnetic powder measured at a temperature of 100° C., and the $SFD_{powder 25° C.}$ is a switching field distribution SFD of ferromagnetic powder measured at a temperature of 25° C.)

Regarding (C), the ΔSFD tends to decrease by performing the alignment process of the magnetic layer as longitudinal alignment. The ΔSFD tends to increase by performing the alignment process of the magnetic layer as homeotropic alignment or setting non-alignment without performing the alignment process.

Accordingly, for example, it is possible to obtain a magnetic tape in which the ΔSFD calculated by Expression 1 is equal to or smaller than 0.50, by respectively controlling one of the methods (A) to (C) or a combination of two or more any methods.

Logarithmic Decrement

The logarithmic decrement acquired by a pendulum viscoelasticity test performed regarding the surface of the magnetic layer of the magnetic tape is equal to or smaller than 0.050. It is surmised that this contributes to prevention of the occurrence of the head element chipping in GTT. From a viewpoint of further preventing the occurrence of the head element chipping in GTT, the logarithmic decrement is preferably equal to or smaller than 0.048, more preferably equal to or smaller than 0.045, and even more preferably equal to or smaller than 0.040. Meanwhile, from a viewpoint of preventing the occurrence of the head element chipping in GTT, it is preferable that the logarithmic decrement is low, and thus, a lower limit value is not particularly limited. The logarithmic decrement can be, for example, equal to or greater than 0.010 or equal to or greater than 0.015. However, the logarithmic decrement may be smaller than the exemplified value. A specific aspect of a method for adjusting the logarithmic decrement will be described later.

FIB Abrasive Diameter

The FIB abrasive diameter obtained from the secondary ion image obtained by irradiating the surface of the magnetic layer of the magnetic tape with the FIB is 0.04 μm to 0.08 μm. It is thought that the FIB abrasive diameter set to be equal to or smaller than 0.08 contributes to the prevention of the chipping of the head element due to the oxide abrasive in the GTT. In addition, it is surmised that the FIB abrasive diameter set to be equal to or greater than 0.04 μm contributes to the removal of a component derived from the magnetic layer attached to the head due to the sliding with the surface of the magnetic layer in the GTT. It is thought that this contributes to prevention of the chipping of the element of the head due to the sliding between the surface of the magnetic layer and the head, in a state where the component derived from the magnetic layer is attached to the head in the GTT. From a viewpoint of further preventing the occurrence of the head element chipping in the GTT, the FIB abrasive diameter is preferably equal to or greater than 0.05 μm and more preferably equal to or greater than 0.06 μm. In addition, from the same viewpoint, the FIB abrasive diameter is preferably equal to or smaller than 0.07 μm. A specific aspect of means for adjusting the FIB abrasive diameter will be described later.

Hereinafter, the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

In one aspect, it is preferable to use ferromagnetic powder in which the difference $\Delta SFD_{powder}$ between the SFD measured at a temperature of 100° C. and the SFD measured at a temperature of 25° C., which are calculated by Expression 2 is in the range described above.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351 can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and an oxide abrasive, and one or more kinds of additives may be randomly included. A high filling percentage of the ferromagnetic powder in the magnetic layer is preferable from a viewpoint of improving recording density.

Binding Agent and Curing Agent

The magnetic tape includes a binding agent in the magnetic layer. The binding agent is one or more kinds of resin. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent, in a case of forming the magnetic layer. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the manufacturing step of the magnetic recording medium. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent added and used can be, for example, 0 to 80.0 parts by mass with respect to 100.0 parts by mass of the binding agent in the magnetic layer Ruffling composition, and is preferably 50.0 to 80.0 parts by mass, from a viewpoint of improvement of hardness of the magnetic layer.

Oxide Abrasive

The magnetic tape includes an oxide abrasive in the magnetic layer. The oxide abrasive is a non-magnetic oxide powder having Mohs hardness exceeding 8 and is preferably a non-magnetic oxide powder having Mohs hardness equal to or greater than 9. A maximum value of Mohs hardness is 10. The oxide abrasive may be an inorganic oxide powder and an organic oxide powder, and is preferably an inorganic oxide powder. Specifically, examples of the abrasive include powders of alumina ($Al_2O_3$), titanium oxide ($TiO_2$), cerium oxide ($CeO_2$), and zirconium oxide ($ZrO_2$), and alumina powder is preferable among these. Mohs hardness of alumina is approximately 9. For alumina powder, a description disclosed in a paragraph 0021 of JP2013-229090A can also be referred to. In addition, as an index of a particle size of the oxide abrasive, a specific surface area can be used. It is thought that, as the specific surface area is great, the particle size of the primary particles of the particles configuring the oxide abrasive is small. As the oxide abrasive, an oxide abrasive in which a specific surface area measured by a Brunauer-Emmett-Teller (BET) method (hereinafter, referred to as a "BET specific surface area") is equal to or greater than 14 $m^2/g$, is preferably used. In addition, from a viewpoint of dispersibility, an oxide abrasive having a BET specific surface area equal to or smaller than 40 $m^2/g$ is preferably used. The content of the oxide abrasive in the magnetic layer is preferably 1.0 to 20.0 parts by mass and more preferably 1.0 to 10.0 parts by mass with respect to 100.0 parts by mass of the ferromagnetic powder.

Additives

The magnetic layer includes ferromagnetic powder, a binding agent and an oxide abrasive, and may further include one or more kinds of additives, if necessary. As the additives, the curing agent described above is used as an example. In addition, examples of the additive which can be included in the magnetic layer include a non-magnetic powder other than the oxide abrasive, a lubricant, a dispersing agent, a dispersing assistant, an antibacterial agent, an antistatic agent, and an antioxidant. As the additives, a commercially available product can be suitably selected or manufactured by a well-known method according to the desired properties, and any amount thereof can be used. For example, for the lubricant, descriptions disclosed in paragraphs 0030 to 0033, 0035, and 0036 of JP2016-126817A can be referred to. The non-magnetic layer may include a lubricant. For the lubricant which may be included in the non-magnetic layer, descriptions disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

In addition, as the dispersing agent, a dispersing agent for increasing dispersibility of the oxide abrasive can be used. As a compound which can function as such a dispersing agent, an aromatic hydrocarbon compound including a phenolic hydroxyl group can be used. The "phenolic hydroxyl group" is a hydroxyl group directly bonded to an aromatic ring. The aromatic ring included in the aromatic hydrocarbon compound may be a monocycle, may have a polycyclic structure, or may be a condensed ring. From a viewpoint of improving dispersibility of the abrasive, an aromatic hydrocarbon compound including a benzene ring or a naphthalene ring is preferable. In addition, the aromatic hydrocarbon compound may include a substituent other than the phenolic hydroxyl group. Examples of the substituent other than the phenolic hydroxyl group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The number of phenolic hydroxyl groups included in one molecule of the aromatic hydrocarbon compound may be one, two, three, or greater.

As a preferable aspect of the aromatic hydrocarbon compound including the phenolic hydroxyl group, a compound represented by General Formula 100 can be used.

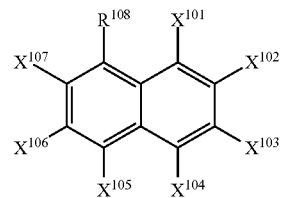

General Formula 100

[In General Formula 100, two of $X^{101}$ to $X^{108}$ are hydroxyl groups and the other six thereof each independently represent a hydrogen atom or a substituent.]

In the compound represented by General Formula 100, substituent positions of the two hydroxyl groups (phenolic hydroxyl groups) are not particularly limited.

In the compound represented by General Formula 100, two of $X^{101}$ to $X^{108}$ are hydroxyl groups (phenolic hydroxyl groups) and the other six thereof each independently represent a hydrogen atom or a substituent. In addition, among $X^{101}$ to $X^{108}$, all of the part other than the two hydroxyl groups may be a hydrogen atom or a part or all thereof may be a substituent. As the substituent, the substituent described above can be used. As the substituent other than the two hydroxyl groups, one or more phenolic hydroxyl groups may be included. From a viewpoint of improving dispersibility of the abrasive, it is preferable that the substituent other than the two hydroxyl groups of $X^{101}$ to $X^{108}$ is not a phenolic hydroxyl group. That is, the compound represented by General Formula 100 is preferably dihydroxynaphthalene or a derivative thereof, and more preferably 2,3-dihydroxynaphthalene or a derivative thereof. Examples of the preferable substituent represented by $X^{101}$ to $X^{108}$ include a halogen atom (for example, a chlorine atom or a bromine atom), an amino group, an alkyl group having 1 to 6 (preferably 1 to 4) carbon atoms, a methoxy group, an ethoxy group, an acyl group, a nitro group, a nitroso group, and a —$CH_2OH$ group.

In addition, for the dispersing agent for increasing dispersibility of the oxide abrasive, a description disclosed in paragraphs 0024 to 0028 of JP2014-179149A can be referred to.

The used amount of the dispersing agent for increasing dispersibility of the oxide abrasive can be, for example, 0.5 to 20.0 parts by mass and is preferably 1.0 to 10.0 parts by mass with respect to 100.0 parts by mass of the abrasive in a case of preparing a magnetic layer forming composition (preferably, in a case of preparing an abrasive solution as will be described later).

As the non-magnetic powder other than the oxide abrasive included in the magnetic layer, non-magnetic powder which can contribute to formation of projections on the surface of the magnetic layer to control of friction properties (hereinafter, also referred to as a "projection formation agent"). As the projection formation agent, various non-magnetic powders generally used as the projection formation agent in the magnetic layer can be used. These may be powder of inorganic substance (inorganic powder) or powder of organic substance (organic powder). In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably inorganic powder. Examples of the inorganic powder include powder of metal oxide, metal carbonate, metal sulfate, metal nitride, metal carbide, and metal sulfide. The particles configuring the projection formation agent (non-magnetic powder other than the oxide abrasive) are preferably colloid particles and more preferably inorganic oxide colloid particles. In addition, from a viewpoint of availability of monodisperse particles, the inorganic oxide configuring the inorganic oxide colloid particles are preferably silicon dioxide (silica). The inorganic oxide colloid particles are more preferably colloidal silica (silica colloid particles). In the invention and the specification, the "colloid particles" are particles which are not precipitated and dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at a random mixing ratio. In another aspect, the projection formation agent is preferably carbon black. An average particle size of the projection formation agent can be, for example, 30 to 300 nm and is preferably 40 to 200 nm. In addition, from a viewpoint that the projection formation agent exhibits the functions thereof in more excellent manner, the content of the projection formation agent in the magnetic layer is preferably 1.0 to 4.0 parts by mass and more preferably 1.5 to 3.5 parts by mass with respect to 100.0 parts by mass of the ferromagnetic powder.

The magnetic layer described above can be provided on the surface of the non-magnetic support directly or indirectly through the non-magnetic layer.

Non-Magnetic Layer

Next, the non-magnetic layer will be described.

The magnetic tape may include a magnetic layer directly on a surface of a non-magnetic support, or may include a non-magnetic layer including a non-magnetic powder and a binding agent between the non-magnetic support and the magnetic layer. The non-magnetic powder included in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0036 to 0039 of JP2010-24113A can be referred to. A content (filling percentage) of the non-magnetic powder in the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described.

As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic tape can also include a back coating layer including non-magnetic powder and a binding agent on a surface side of the non-magnetic support opposite to the surface side provided with the magnetic layer. The back coating layer preferably includes any one or both of carbon black and inorganic powder. For the binding agent included in the back coating layer and various additives which can be randomly included therein, a well-known technology regarding the back coating layer can be applied, and a well-known technology regarding the process of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Various Thicknesses

Thicknesses of the non-magnetic support and each layer of the magnetic tape will be described below.

A thickness of the non-magnetic support is, for example, 3.0 to 80.0 µm, preferably 3.0 to 50.0 µm, and more preferably 3.0 to 10.0 µm.

A thickness of the magnetic layer can be optimized according to a saturation magnetization amount of a magnetic head used, a head gap length, a recording signal band, and the like. The thickness of the magnetic layer is generally 10 nm to 100 nm, preferably 20 to 90 nm, and more preferably 30 to 70 nm, from a viewpoint of realization of high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, equal to or greater than 50 nm, preferably equal to or greater than 70 nm, and more preferably equal to or greater than 100 nm. Meanwhile, the thickness of the non-magnetic layer is preferably equal to or smaller than 800 nm and more preferably equal to or smaller than 500 nm.

A thickness of the back coating layer is preferably equal to or smaller than 0.9 µm and more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with an electron microscope such as a scanning electron microscope or a transmission electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

Preparation of Each Layer Forming Composition

Steps of preparing the composition for forming the magnetic layer, the non-magnetic layer, or the back coating layer generally include at least a kneading step, a dispersing step, and a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology of the related art can be used in various steps. In the kneading step, an open kneader, a continuous kneader, a pressure kneader, or a kneader having a strong kneading force such as an extruder is preferably used. For details of these kneading processes, descriptions disclosed in JP1989-106338A (JP-H01-106338A) and JP1989-79274A (JP-H01-79274A) can be referred to. As a disperser, a well-known disperser can be used. The filtering may be performed by a well-known method in any stage for preparing each layer forming composition. The filtering can be performed by using a filter, for example. As the filter used in the filtering, a filter having a hole diameter of 0.01 to 3 µm (for example, filter made of glass fiber or filter made of polypropylene) can be used, for example. In addition, as described above, as one method of obtaining a magnetic tape in which the ΔSFD calculated by Expression 1 is equal to or smaller than 0.50, it is preferable that the dispersion conditions are reinforced (an increase in dispersion time, a decrease in diameter and/or an increase in degree of filling of dispersion beads used in the dispersion, and the like).

The value of the FIB abrasive diameter tends to decrease, as the oxide abrasive is present in a finer state in the magnetic layer. As means for causing the oxide abrasive to be present in a finer state in the magnetic layer, a dispersing agent capable of increasing dispersibility of the oxide abrasive can be used, as described above. In addition, in order to cause the oxide abrasive to be present in a finer state in the magnetic layer, it is preferable that an abrasive having a small particle size is used, aggregation of the abrasive is prevented, and uneven distribution is prevented to disperse the abrasive in the magnetic layer evenly. As means for this, a method of reinforcing dispersion conditions of the oxide abrasive in a case of preparing the magnetic layer forming composition is used. For example, dispersing the oxide abrasive separately from the ferromagnetic powder is one aspect of the reinforcement of the dispersion conditions. The separate dispersion is specifically a method of preparing a magnetic layer forming composition through a step of mixing an abrasive solution including an oxide abrasive and a solvent (here, ferromagnetic powder is not substantially included) with a magnetic liquid including the ferromagnetic powder, a solvent, and a binding agent. By performing the mixing after dispersing the oxide abrasive separately from the ferromagnetic powder, it is possible to increase dispersibility of the oxide abrasive in the magnetic layer forming composition. The expression "ferromagnetic powder is not substantially included" means that the ferromagnetic powder is not added as a constituent element of the abrasive solution, and a small amount of the ferromagnetic powder mixed as impurities without any intention is allowed. In addition to the separate dispersion or with the separate dispersion, means such as the dispersion process performed for a long period of time, the use of dispersion medium having a small size (for example, a decrease in diameter of dispersion beads in the beads dispersion), a high degree of filling of the dispersion medium in the disperser can be randomly combined to reinforce the dispersion conditions. For the disperser and the dispersion medium, a commercially available product can be used. In addition, a centrifugal separation process of the abrasive solution contributes to the oxide abrasive present in the magnetic layer in a finer state, by removing particles having a size greater than an average particle size and/or aggregated particles from the particles configuring the oxide abrasive. The centrifugal separation process can be performed by a commercially available centrifugal separator. In addition, the filtering of the abrasive solution performed by using a filter or the like is preferable for removing a coarse aggregate of the aggregated particles configuring the oxide abrasive. The removal of such coarse aggregate can contribute to the oxide abrasive present in the magnetic layer in a finer state. For example, the filtering by using a filter having a smaller hole diameter can contribute to the oxide abrasive present in the magnetic layer in a finer state. In addition, by adjusting various process conditions (for example, stirring conditions, dispersion process conditions, filtering conditions, and the like) after mixing the abrasive solution with the component for preparing the magnetic layer forming composition such as the ferromagnetic powder or the like, it is possible to increase dispersibility of the oxide abrasive in the magnetic layer forming composition. This can also contribute to the oxide abrasive present in the magnetic layer in a finer state. However, in a case where the oxide abrasive is present in the magnetic layer in an extremely finer state, the FIB abrasive diameter may be smaller than 0.04 μm, and therefore, it is preferable that various conditions for preparing the abrasive solution are adjusted so as to realize the FIB abrasive diameter of 0.04 μm to 0.08 μm.

Coating Step, Cooling Step, Heating and Drying Step, Burnishing Treatment Step, and Curing Step The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

In a preferred aspect, a magnetic layer can be formed through a magnetic layer forming step including a coating step of applying a magnetic layer forming composition including a ferromagnetic powder, a binding agent, an abrasive, a curing agent, and a solvent onto a non-magnetic support directly or with a non-magnetic layer interposed therebetween, to form a coating layer, a heating and drying step of drying the coating layer by a heating process, and a curing step of performing a curing process with respect to the coating layer. The magnetic layer forming step preferably includes a cooling step of cooling the coating layer between the coating step and the heating and drying step, and more preferably includes a burnishing treatment step of performing a burnishing treatment with respect to the surface of the coating layer between the heating and drying step and the curing step.

It is thought that it is preferable that the cooling step and the burnishing treatment step in the magnetic layer forming step, in order to set the logarithmic decrement to be equal to or smaller than 0.050. More specific description is as follows.

It is surmised that performing the cooling step of cooling the coating layer between the coating step and the heating and drying step contributes to causing pressure sensitive adhesive component described above is localized in the surface and/or a surface layer part in the vicinity of the surface of the coating layer. It is thought that this is because the pressure sensitive adhesive component at the time of solvent volatilization in the heating and drying step is easily moved to the surface and/or the surface layer part of the coating layer, by cooling the coating layer of the magnetic layer forming composition before the heating and drying step. However, the reason thereof is not clear. It is thought that the pressure sensitive adhesive component can be removed by performing the burnishing treatment with respect to the surface of the coating layer in which the pressure sensitive adhesive component is localized on the surface and/or surface layer part. It is surmised that performing the curing step after removing the pressure sensitive adhesive component contributes setting the logarithmic decrement to be equal to or smaller than 0.050. However, this is merely a surmise, and the invention is not limited thereto.

As described above, multilayer coating of the magnetic layer forming composition can be performed with the non-magnetic layer forming composition in order or at the same time. In a preferred aspect, the magnetic tape can be manufactured by successive multilayer coating. A manufacturing step including the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

Hereinafter, a specific aspect of the manufacturing method will be described with reference to FIG. 4. However, the invention is not limited to the following specific aspect.

Figure 4:
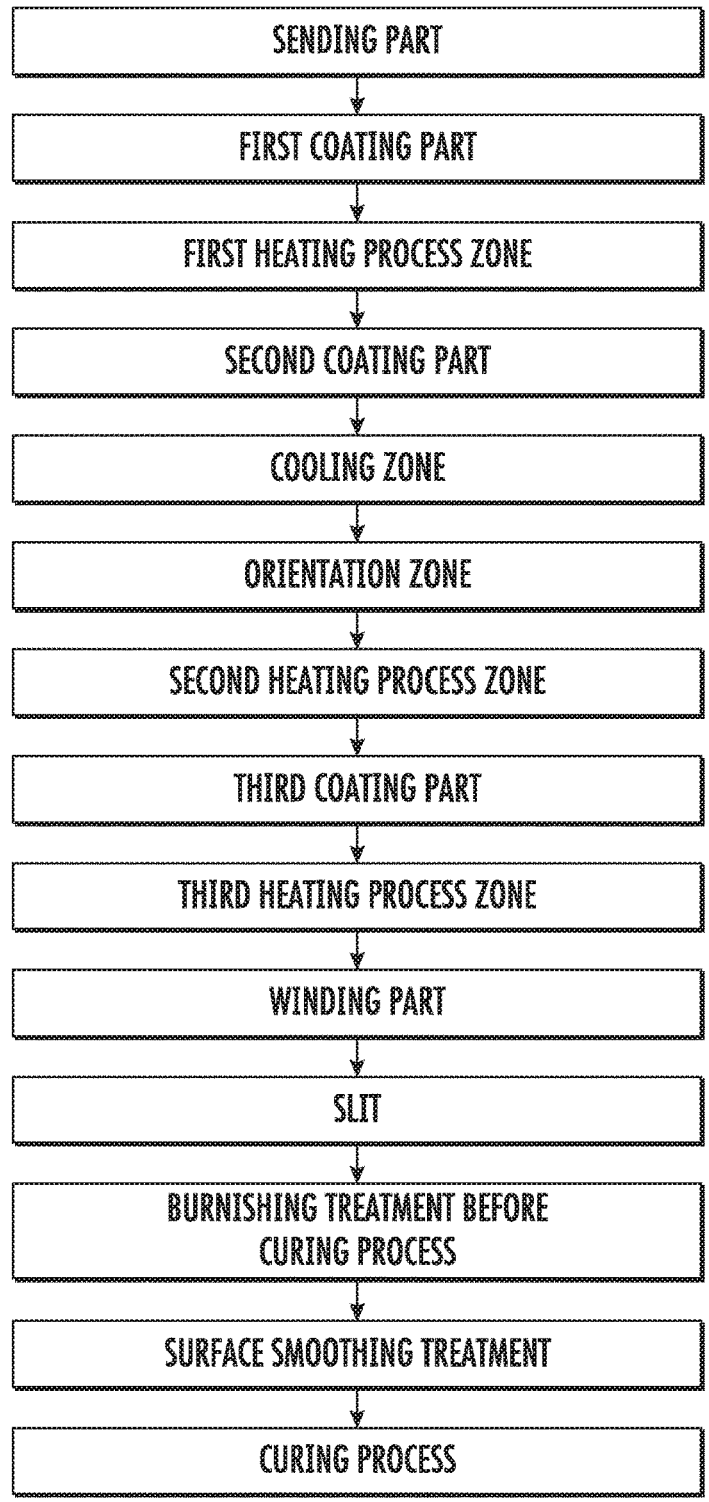
FIG. 4 shows an example (step schematic view) of a specific aspect of a magnetic tape manufacturing step.
Figure 5:
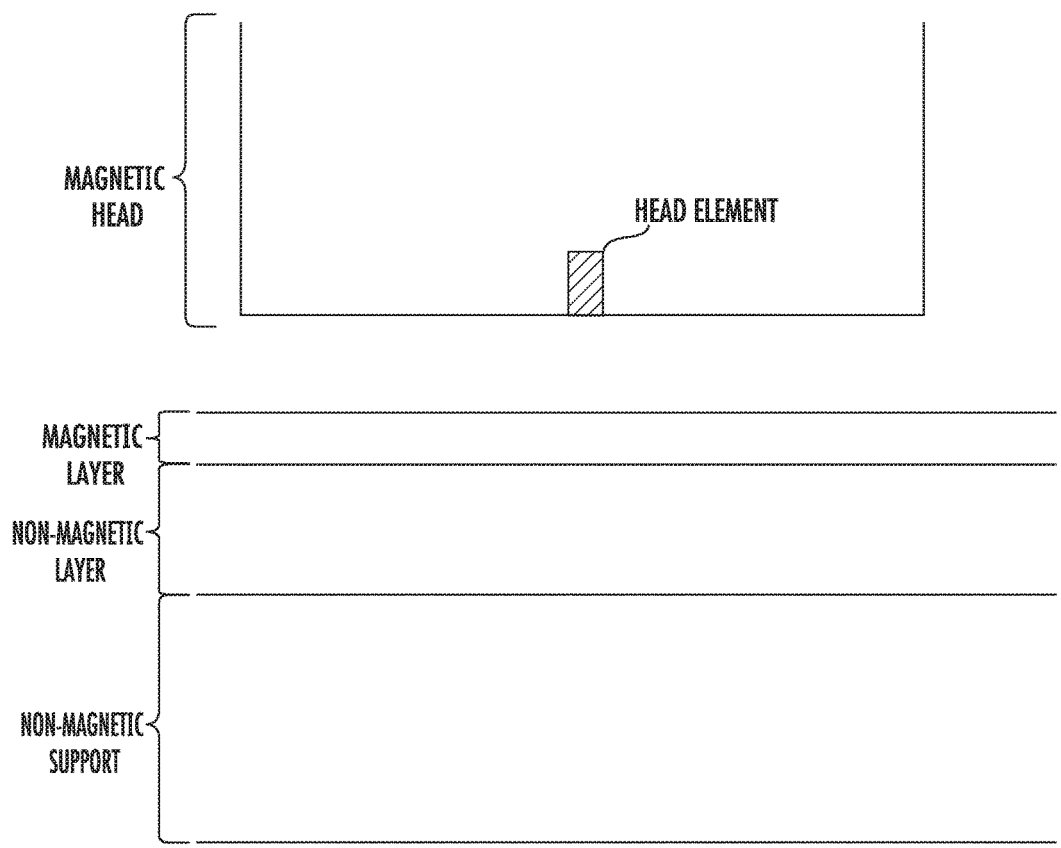
FIG. 5 is a schematic illustration of an embodiment of a magnetic recording and reproducing device of the invention which comprises a head element in a magnetic head, positioned relative to a magnetic tape which includes a non-magnetic support, a non-magnetic layer, and a magnetic layer including ferromagnetic powder and a binding agent, in this order.

FIG. 4 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 4, an operation of sending a non-magnetic support (elongated film) from a sending part and winding the non-magnetic support around a winding part is continuously performed, and various processes of coating, drying, and alignment are performed in each part or each zone shown in FIG. 4, and thus, it is possible to sequentially form a non-magnetic layer and a magnetic layer on one surface of the running non-magnetic support by multilayer coating and to form a back coating layer on the other surface thereof. Such a manufacturing method can be set to be identical to the manufacturing method normally performed for manufacturing a coating type magnetic recording medium, except for including a cooling zone in the magnetic layer forming step and including the burnishing treatment step before the curing process.

The non-magnetic layer forming composition is applied onto the non-magnetic support sent from the sending part in a first coating part (coating step of non-magnetic layer forming composition).

After the coating step, in a first heating process zone, the coating layer of the non-magnetic layer forming composition formed in the coating step is heated after to dry the coating layer (heating and drying step). The heating and drying step can be performed by causing the non-magnetic support including the coating layer of the non-magnetic layer forming composition to pass through the heated atmosphere. An atmosphere temperature of the heated atmosphere here can be, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After the coating step, a coating layer of the magnetic layer forming composition formed in the coating step is cooled in a cooling zone (cooling step). For example, it is possible to perform the cooling step by allowing the non-magnetic support on which the coating layer is formed on the non-magnetic layer to pass through a cooling atmosphere. An atmosphere temperature of the cooling atmosphere is preferably −10° C. to 0° C. and more preferably −5° C. to 0° C. The time for performing the cooling step (for example, time while any part of the coating layer is delivered to and sent from the cooling zone (hereinafter, also referred to as a "staying time")) is not particularly limited. In a case where the staying time is long, the logarithmic decrement tends to be decreased. Thus, the staying time is preferably adjusted by performing preliminary experiment if necessary, so that the logarithmic decrement equal to or smaller than 0.050 is realized. In the cooling step, cooled air may blow to the surface of the coating layer.

After that, in the aspect of performing the alignment process, while the coating layer of the magnetic layer forming composition is wet, an alignment process of the ferromagnetic powder in the coating layer is performed in an alignment zone. For the alignment process, various well-known technologies such as a description disclosed in a paragraph 0067 of JP2010-231843A can be used. As described above, as the particles of the ferromagnetic powder are aligned in a longitudinal direction (as a degree of alignment in a longitudinal direction increases), the value of the ΔSFD tends to decrease, and as a degree of alignment in a longitudinal direction decreases, the value thereof tends to increase.

The coating layer after the alignment process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By doing so, it is possible to obtain the magnetic tape including the coating layer of the magnetic layer forming composition heated and dried on the non-magnetic layer, on one surface side of the non-magnetic support, and the back coating layer on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the magnetic layer forming composition, before performing the curing process (heating and light irradiation) in accordance with the types of the curing agent included in the magnetic layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.050. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.050 by performing the burnishing treatment in the stage described above. This point was newly found by the inventors.

The burnishing treatment can be preferably performed by performing one or both of rubbing of the surface of the coating layer of the treatment target by a polishing tape (polishing) and rubbing of the surface of the coating layer of the treatment target by a grinding tool (grinding). It is preferable to use a polishing tape including at least one of an abrasive having higher Mohs hardness than that of the oxide abrasive described above. As the polishing tape, a commercially available product may be used and a polishing tape manufactured by a well-known method may be used. As the grinding tool, a well-known blade such as a fixed blade, a diamond wheel, or a rotary blade, or a grinding blade can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the magnetic layer forming composition. In the aspect shown in FIG. 4, the coating layer of the magnetic layer forming composition is subjected to the surface smoothing treatment, after the burnishing treatment and before the curing process. The surface smoothing treatment is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the magnetic layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the magnetic layer forming composition used in the coating layer formation, the type of the curing agent, and the thickness of the coating layer. For example, in a case where the coating layer is formed by using the magnetic layer forming composition including polyisocyanate as the curing agent, the curing process is preferably the heating process. In a case where the curing agent is included in a layer other than the magnetic layer, a curing reaction of the layer can also be promoted by the curing process here. Alternatively, the curing step may be separately provided. After the curing step, the burnishing treatment may be further performed.

As described above, it is possible to obtain the magnetic tape according to one aspect of the invention. However, the manufacturing method described above is merely an example, values of the ΔSFD, the logarithmic decrement of the magnetic layer surface, and the FIB abrasive diameter can be controlled to be in respective ranges described above by any means capable of adjusting the values thereof, and such an aspect is also included in the invention.

The magnetic tape is normally accommodated in a magnetic tape cartridge and the magnetic tape cartridge is mounted in a magnetic recording and reproducing device. A servo pattern can also be formed in the magnetic tape by a well-known method, in order to allow head tracking servo to be performed in the magnetic recording and reproducing device.

Magnetic Recording and Reproducing Device

One aspect of the invention relates to a magnetic recording and reproducing device including the magnetic tape and a magnetic head.

In the invention and the specification, the "magnetic recording and reproducing device" means a device capable of performing at least one of the recording of information on the magnetic tape or the reproducing of information recorded on the magnetic tape. Such a device is generally called a drive. The magnetic head included in the magnetic recording and reproducing device can be a recording head capable of performing the recording of information on the magnetic tape, or can be a reproducing head capable of performing the reproducing of information recorded on the magnetic tape. In addition, in one aspect, the magnetic recording and reproducing device can include both of a recording head and a reproducing head as separate magnetic heads. In another aspect, the magnetic head included in the magnetic recording and reproducing device can also have a configuration of including both of a recording element and a reproducing element in one magnetic head. In addition, the magnetic head which performs the recording of information and/or the reproducing of information may include a servo pattern reading element. Alternatively, as a head other than the magnetic head which performs the recording of information and/or the reproducing of information, a magnetic head (servo head) including a servo pattern reading element may be included in the magnetic recording and reproducing device.

In the magnetic recording and reproducing device, the recording of information on the magnetic tape and the reproducing of information recorded on the magnetic tape can be performed by bringing the surface of the magnetic layer of the magnetic tape into contact with the magnetic head and sliding. The magnetic recording and reproducing device may include the magnetic tape according to one aspect of the invention and well-known technologies can be applied for other configurations.

The magnetic tape according to one aspect of the invention can exhibit excellent electromagnetic conversion characteristics in the magnetic recording and reproducing device. That is, in the magnetic recording and reproducing device, the information recorded on the magnetic tape according to one aspect of the invention can be reproduced at a high SNR. In addition, in the magnetic recording and reproducing device, the GTT can be performed while changing the magnetic tape with a new product. In this GTT, according to the magnetic tape according to one aspect of the invention, it is possible to prevent occurrence of the head element chipping. The element for preventing the occurrence of the head element chipping can be one or more elements selected from the group consisting of a reproducing element, recording element, and a servo pattern reading element, and two or more elements can also be used. The reproducing element is preferably a magnetoresistive (MR) element capable of reading information recorded on the magnetic tape with excellent sensitivity. In addition, the MR element is also preferable as the servo pattern reading element. As a head (MR head) including the MR element as the reproducing element and/or the servo pattern reading element, various well-known MR heads can be used.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted. Further, "eq" described below is an equivalent which is a unit which cannot be converted into the SI unit system.

Example 1

A list of each layer forming composition is shown below.
Preparation of Abrasive Solution The amount of 2,3-dihydroxynaphthalene (manufactured by Tokyo Chemical Industry Co., Ltd.) shown in condition C of Table 1, 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of an oxide abrasive (alumina powder) shown in condition C of Table 1, and dispersed in the presence of zirconia beads (bead diameter: 0.1 mm) by a paint shaker for a period of time shown in condition C of Table 1 (bead dispersion time). After the dispersion, the centrifugal separation process of a dispersion liquid obtained by separating the dispersion liquid from the beads by mesh was performed. The centrifugal separation process was performed by using CS150GXL manufactured by Hitachi, Ltd. (rotor used is S100AT6 manufactured by Hitachi, Ltd.) as a centrifugal separator at a rotation per minute (rpm) shown in the condition C of Table 1, for a period of time (centrifugal separation time) shown in the condition C of Table 1. After that, the filtering was performed by using a filter having a hole diameter shown in the condition C of Table 1, and an alumina dispersion (abrasive solution) was obtained.

Preparation of Magnetic Layer Forming Composition

Magnetic Liquid

Ferromagnetic powder (ferromagnetic hexagonal barium ferrite powder): 100.0 parts
    Average particle size and $\Delta SFD_{powder}$ calculated by Expression 2: see Table 2

SO$_3$Na group-containing polyurethane resin: 14.0 parts
    Weight-average molecular weight: 70,000, SO$_3$Na group: 0.2 meq/g Cyclohexanone: 150.0 parts Methyl ethyl ketone: 150.0 parts Abrasive Solution Abrasive solution described above: 6.0 parts Projection Formation Agent Liquid (Silica Sol)

Colloidal silica: 2.0 parts
    (Average particle size: 80 nm)

Methyl ethyl ketone: 8.0 parts

Other components

Stearic acid: 3.0 parts

Stearic acid amide: 0.3 parts

Butyl stearate: 6.0 parts

Methyl ethyl ketone: 110.0 parts

Cyclohexanone: 110.0 parts

Polyisocyanate (CORONATE (registered trademark) L manufactured by Tosoh Corporation): 3.0 parts Preparation Method A magnetic liquid was prepared by performing beads-dispersing of various components of the magnetic liquid described above by using beads as the dispersion medium in a batch type vertical sand mill. The dispersion time of the beads dispersion was set as the dispersion time shown in Table 2 and zirconia beads having a bead diameter of 0.5 mm were used as the dispersion beads.

The magnetic liquid, the abrasive solution, the projection formation agent liquid, and the other components were introduced in a dissolver stirrer and stirred at a circumferential speed of 10 m/sec for a period of time shown in the condition C of Table 1 (stirring time). After that, a ultrasonic dispersion process was performed at a flow rate of 7.5 kg/min with a flow type ultrasonic disperser for a period of time shown in the condition C of Table 1 (ultrasonic dispersion time), and filtering with a filter having a hole diameter shown in the condition C of Table 1 was performed for the number of times shown in the condition C of Table 1, thereby preparing the magnetic layer forming composition. A part of the prepared magnetic layer forming composition was collected and a dispersion particle diameter which is an index for dispersibility of ferromagnetic powder (ferromagnetic hexagonal barium ferrite powder) was measured by a method which will be described later. The measured value is shown in Table 2.

Preparation of Non-Magnetic Layer Forming Composition

A non-magnetic layer forming composition was prepared by dispersing various components of the non-magnetic layer forming composition with a batch type vertical sand mill by using zirconia beads having a bead diameter of 0.1 mm for 24 hours, and then performing filtering with a filter having a hole diameter of 0.5 μm.

Non-magnetic inorganic powder: α-iron oxide: 100.0 parts
    (Average particle size: 10 nm, BET specific surface area: 75 m$^2$/g)

Carbon black: 25.0 parts
    (Average particle size: 20 nm)

A SO$_3$Na group-containing polyurethane resin: 18.0 parts
    (Weight-average molecular weight: 70,000, content of SO$_3$Na group: 0.2 meq/g)

Stearic acid: 1.0 parts

Cyclohexanone: 300.0 parts

Methyl ethyl ketone: 300.0 parts

Preparation of Back Coating Layer Forming Composition

Components among various components of the back coating layer forming composition except a lubricant (stearic acid and butyl stearate), polyisocyanate, and 200.0 parts of cyclohexanone were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 μm and a back coating layer forming composition was prepared.

Non-magnetic inorganic powder: α-iron oxide: 80.0 parts
    (Average particle size: 0.15 μm, BET specific surface area: 52 m$^2$/g)

Carbon black: 20.0 parts
    (Average particle size: 20 nm)

A vinyl chloride copolymer: 13.0 parts

A sulfonic acid salt group-containing polyurethane resin: 6.0 parts

Phenylphosphonic acid: 3.0 parts

Cyclohexanone: 155.0 parts

Methyl ethyl ketone: 155.0 parts

Stearic acid: 3.0 parts

Butyl stearate: 3.0 parts

Polyisocyanate: 5.0 parts

Cyclohexanone: 200.0 parts

Manufacturing of Magnetic Tape

A magnetic tape was manufactured by the specific aspect shown in FIG. 4. The magnetic tape was specifically manufactured as follows.

A support made of polyethylene naphthalate having a thickness of 5.0 μm was sent from the sending part, and the non-magnetic layer forming composition was applied to one surface thereof so that the thickness after the drying becomes 100 nm in the first coating part to form a coating layer, and was dried in the first heating process zone (atmosphere temperature of 100° C.) to form a coating layer.

Then, the magnetic layer forming composition was applied onto the non-magnetic layer so that the thickness after the drying becomes 70 nm in the second coating part, and a coating layer was formed. The cooling step was performed by passing the formed coating layer through the cooling zone in which the atmosphere temperature is adjusted to 0° C. for the staying time shown in Table 2 while the coating layer is wet, and then the coating layer was dried in the second heating process zone (atmosphere temperature of 100° C.), without performing the alignment process (non-alignment) in the example.

After that, in the third coating part, the back coating layer forming composition was applied to the surface of the non-magnetic support made of polyethylene naphthalate on a side opposite to the surface where the non-magnetic layer and the magnetic layer are formed, so that the thickness after the drying becomes 0.4 μm, to form a coating layer, and the formed coating layer was dried in a third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the magnetic layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) of 90° C.

Then, a heating process (curing process) was performed in the environment of the atmosphere temperature of 70° C. for 36 hours, and then, a servo pattern was formed on the magnetic layer by a commercially available servo writer.

By doing so, a magnetic tape of Example 1 was obtained.

Examples 2 to 9 and Comparative Examples 1 to 9

A magnetic tape was manufactured in the same manner as in Example 1, except that various items shown in Table 1 and Table 2 were changed as shown in each table.

All of the oxide abrasive shown in Table 1 are alumina powder.

In Table 2, in the comparative examples in which "none" is shown in a column of the alignment, the magnetic layer was formed without performing the alignment process in the same manner as in Example 1.

In the examples in which "longitudinal" is disclosed in a column of the alignment, the cooling step was performed by passing the coating layer through the cooling zone in which the atmosphere temperature is adjusted to 0° C. for the staying time shown in Table 2 while the coating layer of the magnetic layer forming composition is wet, and then, a longitudinal alignment process was performed by applying a magnetic field having a magnetic field strength of 0.3 T to the surface of the coating layer in a longitudinal direction. After that, the coating layer was dried in the second heating process zone (atmosphere temperature of 100° C.).

In Table 2, in the comparative examples in which "not performed" is disclosed in a column of the cooling zone staying time and a column of the burnishing treatment before the curing process, a magnetic tape was manufactured by a manufacturing step not including a cooling zone in the magnetic layer forming step and not performing the burnishing treatment and the wiping treatment before the curing process.

Evaluation of Ferromagnetic Powder and Magnetic Layer Forming Composition (1) Dispersion Particle Diameter of Magnetic Layer Forming Composition A part of the magnetic layer forming composition prepared as described above was collected, and a sample solution diluted by an organic solvent used in the preparation of the composition to 1/50 based on mass was prepared. Regarding the prepared sample solution, an arithmetic average particle diameter measured by using an optical scattering type particle size analyzer (LB500 manufactured by Horiba, Ltd.) was used as the dispersion particle diameter.

(2) Average Particle Size of Ferromagnetic Powder

An average particle size of the ferromagnetic powder was obtained by the method described above.

(3) $\Delta SFD_{powder}$ and Coercivity Hc of Ferromagnetic Powder

Regarding the ferromagnetic powder, the SFDs were measured at a temperature of 100° C. and a temperature of 25° C. with an application magnetic field of 796 kA/m (10 kOe) by using a vibration sample magnetometer (manufactured by Toei Industry Co., Ltd.). From measurement results of the SFDs, the $\Delta SFD_{powder}$ was calculated by Expression 2.

The coercivity He of the ferromagnetic powder was measured at a temperature of 25° C. with an application magnetic field of 796 kA/m (10 kOe) by using a vibration sample magnetometer (manufactured by Toei Industry Co., Ltd.).

Evaluation of Physical Properties of Magnetic Tape (1) $\Delta SFD$

The SFDs were measured in a longitudinal direction of the magnetic tape at a temperature of 25° C. and a temperature of −190° C. with an application magnetic field of 796 kA/m (10 kOe) by using a vibration sample magnetometer (manufactured by Toei Industry Co., Ltd.). From measurement results, the $\Delta SFD$ in a longitudinal direction of the magnetic tape was calculated by Expression 1.

(2) Measurement of Logarithmic Decrement of Magnetic Layer Surface

The logarithmic decrement of the magnetic layer surface of the magnetic tape was acquired by the method described above by using a rigid-body pendulum type physical properties testing instrument RPT-3000W manufactured by A&D Company, Limited (pendulum: rigid-body pendulum FRB-100 manufactured by A&D Company, weight: not employed, round-bar type cylinder edge: RBP-040 manufactured by A&D Company, substrate: glass substrate, a rate of temperature increase of substrate: 5° C./min) as the measurement device.

A commercially available slide glass was cut into a size of 25 mm (short side)×50 mm (long side) and employed as the glass substrate. In a state where the magnetic tape was placed on the center part of the glass substrate so that the longitudinal direction of the magnetic tape was parallel to the direction of the short side of the glass substrate, four corners of the magnetic tape were fixed on the glass substrate with a fixing tape (Kapton tape manufactured by Du Pont-Toray Co., Ltd.). Then, portions of the magnetic tape protruding from the glass substrate were cut out. In the above manner, the measurement sample was placed on a glass substrate by being fixed at 4 portions as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

(3) FIB Abrasive Diameter

The FIB abrasive diameter of each manufactured magnetic tape was obtained by the following method.

As a focused ion beam device, MI4050 manufactured by Hitachi High-Technologies Corporation was used, and the image analysis software, ImageJ which is free software was used.

(i) Acquiring of Secondary Ion Image

The surface of the back coating layer of the sample for measurement cut out from each manufactured magnetic tape was bonded to an adhesive layer of a commercially available carbon double-sided tape for SEM measurement (double-sided tape in which a carbon film is formed on a base material formed of aluminum). An adhesive layer of this double-sided tape on a surface opposite to the surface bonded to the surface of the back coating layer was bonded to a sample table of the focused ion beam device. By doing so, the sample for measurement was disposed on the sample table of the focused ion beam device so that the surface of the magnetic layer faces upwards.

Without performing the coating process before the imaging, the beam setting of the focused ion beam device was set so that an acceleration voltage is 30 kV, a current value is 133 pA, a beam size is 30 nm, and a brightness is 50%, and an SI signal was detected by a secondary ion detector. ACB was carried out at three spots on a non-imaged region of the surface of the magnetic layer to stabilize a color of the image. Then, the contrast reference value and the brightness reference value were determined. The brightness reference value as determined in the above ACB and the contrast value which was lowered by 1% from the contrast reference value as determined in the above ACB were determined as the conditions for capturing a secondary ion image. A non-imaged region of the surface of the magnetic layer was selected and imaging was performed under the conditions for capturing as determined above and at a pixel distance of 25.0 (nm/pixel). As an image capturing method, PhotoScan Dot×4_Dwell Time 15 μsec (capturing time: 1 min), and a capturing size was set as 25 μm×25 μm. By doing so, a secondary ion image of a region of the surface of the magnetic layer having a size of 25 μm×25 μm was obtained. After the scanning, the obtained secondary ion image was stored as a file format, JPEG, by ExportImage, by clicking mouse right button on the captured screen. The pixel number of the image which was 2,000 pixel×2,100 pixel was confirmed, the cross mark and the micron bar on the captured image were deleted, and an image of 2,000 pixel×2,000 pixel was obtained.

(ii) Calculation of FIB Abrasive Diameter

The image data of the secondary ion image obtained in (i) was dragged and dropped in ImageJ which is the image analysis software.

A tone of the image data was changed to 8 bit by using the image analysis software. Specifically, Image of the operation menu of the image analysis software was clicked and 8 bit of Type was selected.

For the binarization process, 250 gradations was selected as a lower limit value, 255 gradations was selected as an upper limit value, and the binarization process was executed by these two threshold values. Specifically, on the operation menu of the image analysis software, Image was clicked, Threshold of Adjust was selected, the lower limit value was selected as 250, the upper limit value was selected as 255, and then, apply was selected. Regarding the obtained image, Process of the operation menu of the image analysis software was clicked, Despeckle of Noise was selected, and Size 4.0-Infinity was set on AnalyzeParticle to remove noise components.

Regarding the binarization process image obtained as described above, AnalyzeParticle was selected from the operation menu of the image analysis software, and the number and Area (unit: Pixel) of white-shining portions on the image were obtained. The area of each white-shining portion on the image was obtained by converting Area (unit: Pixel) into the area by the image analysis software. Specifically, 1 pixel of the image obtained under the imaging conditions corresponded to 0.0125 μm, and accordingly, the area A [μm$^2$] was calculated by an expression, area A=Area pixel×0.0125$^2$. By using the area calculated as described above, an equivalent circle diameter L of each white-shining portion was obtained by an expression, equivalent circle diameter L=(A/π")^(½)×2=L.

The above step was performed four times at different portions (25 μm×25 μm) of the surface of the magnetic layer of the sample for measurement, and the FIB abrasive diameter was calculated from the obtained result by an expression, FIB abrasive diameter=Σ(Li)/Σi.

Evaluation of Electromagnetic Conversion Characteristics (SNR)

The electromagnetic conversion characteristics of each manufactured magnetic tape were measured with a reel tester having a width of ½ inches (0.0127 meters) to which a head was fixed, by the following method. The following recording and reproducing were performed by sliding the surface of the magnetic layer of the magnetic tape and the head.

A running speed of the magnetic tape (magnetic head/magnetic tape relative speed) was set as 4 m/sec. As a recording head, a metal-in-gap (MIG) head (gap length of 0.15 μm, track width of 1.0 μm) was used, and a recording current was set as an optimal recording current of each magnetic tape. As a reproducing head, a giant-magnetoresistive (GMR) head having an element thickness of 15 nm, a shield interval of 0.1 μm, and a lead width of 0.5 μm was used. A signal was recorded at linear recording density (300 kfci) and a reproducing signal was measured with a spectrum analyzer manufactured by Shibasoku Co., Ltd. A ratio of an output value of a carrier signal and integral noise over whole spectral range was set as an SNR. For the SNR measurement, a part of a signal which is sufficiently stabilized after running of the magnetic tape was used. The SNR was shown in Table 2 as a relative value in a case where the SNR of Comparative Example 1 was set as 0.0 dB. The unit kfci is a unit of linear recording density (cannot be converted into the unit SI).

Head Element Chipping Amount in GTT

A magnetic head (MR head) used in a tape drive of TS 1140 manufactured by IBM was attached to a reel tester, the magnetic tape having a length of 1000 m of 1 reel was caused to run for 200 passes, by setting a running speed (magnetic head/magnetic tape relative speed) as 4 m/sec while sliding the surface of the magnetic layer and the MR head.

The same running of 200 passes was repeated by replacing the magnetic tape with a new product (1,000 reels of the magnetic tape were used), and the chipping amount of the MR element of the MR head was measured by the following method.

A carbon film was vapor-deposited on the surface of the MR head including a surface slid on the surface magnetic layer by using a vacuum deposition device (JEE-4X manufactured by JEOL), and a platinum film was formed by sputtering on this carbon film by using an ion sputtering device (E-1030 manufactured by Hitachi High-Technologies Corporation. After that, a cross section parallel to the sliding direction of the magnetic tape in a case of running, was exposed from the MR head by using A FIB-SEM combined machine, Helios 400S manufactured by MRFEI, and a sample for cross section observation (piece having a thickness of 100 nm) was cut out so that the MR element was included in the cross section. A distance in a vertical direction between the sliding surface of the surface of the magnetic layer and the top of the MR element was obtained by using a TEM image obtained by observing the sample for cross section observation using a transmission electron microscope (TEM) (Titan 80-300 manufactured by FEI) at an acceleration voltage of 300 kV. A difference between the obtained distance and a distance obtained by the same method regarding unused MR head was shown as the head element chipping amount in GTT in Table 2.

TABLE 1

| | Conditions | A | B | C | D | E | F |
|---|---|---|---|---|---|---|---|
| Preparation of abrasive solution | Oxide abrasive product name (manufactured by Sumitomo Chemical Co., Ltd.) | Hit80 | Hit80 | Hit80 | Hit100 | Hit70 | Hit80 |
| | Oxide abrasive BET specific surface area (m²/g) | 30 | 30 | 30 | 40 | 20 | 30 |
| | Content of abrasive solution dispersing agent (2,3-dihydroxynaphthalene) | 3.0 parts | 0 part | 3.0 parts | 3.0 parts | 3.0 parts | 3.0 parts |
| | Beads dispersion time | 5 min | 60 min | 60 min | 180 min | 60 min | 180 min |
| Centrifugal separation | Rotation rate | None | 3500 rpm | 3500 rpm | 3500 rpm | 5500 rpm | 3500 rpm |
| | Centrifugal separation time | None | 4 min | 4 min | 4 min | 4 min | 4 min |
| | Filter hole diameter | 0.5 μm | 0.3 μm | 0.3 μm | 0.3 μm | 0.3 μm | 0.3 μm |
| Preparation of magnetic layer forming composition | Stirring time | 30 min | 60 min | 360 min | 360 min | 180 min | 360 min |
| | Ultrasonic dispersion time | 0.5 min | 60 min | 60 min | 60 min | 60 min | 60 min |
| | Filter hole diameter | 0.5 μm | 0.3 μm | 0.3 μm | 0.3 μm | 0.3 μm | 0.3 μm |
| | Number of times of filter process | 1 | 2 | 3 | 3 | 2 | 3 |

TABLE 2

| | Ferromagnetic powder | | | | Dispersion | | | Preparation condition of abrasive solution and magnetic layer forming composition |
|---|---|---|---|---|---|---|---|---|
| | $\Delta SFD_{powder}$ | Hc (kA/m) | Hc (Oe) | Average particle size (nm) | Beads dispersion time (time) | Dispersion particle diameter (nm) | Alignment | |
| Comparative Example 1 | 0.30 | 157 | 1978 | 25 | 48 | 20 | None | A |
| Comparative Example 2 | 0.30 | 157 | 1978 | 25 | 48 | 20 | None | B |
| Comparative Example 3 | 0.30 | 157 | 1978 | 25 | 48 | 20 | None | C |
| Comparative Example 4 | 0.30 | 157 | 1978 | 25 | 48 | 20 | None | D |
| Comparative Example 5 | 0.20 | 160 | 2011 | 25 | 48 | 20 | None | C |
| Comparative Example 6 | 0.20 | 160 | 2011 | 25 | 48 | 20 | None | A |
| Comparative Example 7 | 0.20 | 160 | 2011 | 25 | 48 | 20 | None | B |
| Comparative Example 8 | 0.20 | 160 | 2011 | 25 | 48 | 20 | None | D |
| Comparative Example 9 | 0.30 | 157 | 1978 | 25 | 48 | 20 | None | C |
| Example 1 | 0.20 | 160 | 2011 | 25 | 48 | 20 | None | C |
| Example 2 | 0.80 | 147 | 1850 | 24 | 48 | 20 | Longitudinal | C |
| Example 3 | 0.30 | 157 | 1978 | 25 | 48 | 20 | Longitudinal | C |
| Example 4 | 0.10 | 146 | 1840 | 23 | 35 | 50 | Longitudinal | C |
| Example 5 | 0.10 | 146 | 1840 | 23 | 48 | 20 | Longitudinal | C |
| Example 6 | 0.30 | 157 | 1978 | 25 | 48 | 20 | Longitudinal | E |
| Example 7 | 0.30 | 157 | 1978 | 25 | 48 | 20 | Longitudinal | F |
| Example 8 | 0.30 | 157 | 1978 | 25 | 48 | 20 | Longitudinal | C |
| Example 9 | 0.30 | 157 | 1978 | 25 | 48 | 20 | Longitudinal | C |

| | Cooling zone staying time | Burnishing treatment before curing process | Logarithmic decrement of magnetic layer surface | $\Delta SFD$ | FIB abrasive diameter | SNR (dB) | Head element chipping amount in GTT (nm) |
|---|---|---|---|---|---|---|---|
| Comparative Example 1 | Not performed | Not performed | 0.060 | 0.63 | 0.16 μm | 0.0 | 10.0 |
| Comparative Example 2 | Not performed | Not performed | 0.060 | 0.63 | 0.11 μm | 1.0 | 7.1 |
| Comparative Example 3 | Not performed | Not performed | 0.060 | 0.63 | 0.06 μm | 2.1 | 4.0 |

TABLE 2-continued

| | | | | | | | |
|---|---|---|---|---|---|---|---|
| Comparative Example 4 | Not performed | Not performed | 0.060 | 0.63 | 0.03 μm | 3.0 | 5.9 |
| Comparative Example 5 | Not performed | Not performed | 0.060 | 0.48 | 0.06 μm | 5.0 | 4.0 |
| Comparative Example 6 | 1 second | Performed | 0.048 | 0.48 | 0.16 μm | 3.1 | 9.1 |
| Comparative Example 7 | 1 second | Performed | 0.048 | 0.48 | 0.11 μm | 3.9 | 6.0 |
| Comparative Example 8 | 1 second | Performed | 0.048 | 0.48 | 0.03 μm | 6.0 | 7.9 |
| Comparative Example 9 | 1 second | Performed | 0.048 | 0.63 | 0.06 μm | 2.0 | 0.0 |
| Example 1 | 1 second | Performed | 0.048 | 0.48 | 0.06 μm | 5.1 | 0.0 |
| Example 2 | 1 second | Performed | 0.048 | 0.33 | 0.06 μm | 5.0 | 0.0 |
| Example 3 | 1 second | Performed | 0.048 | 0.21 | 0.06 μm | 5.1 | 0.0 |
| Example 4 | 1 second | Performed | 0.048 | 0.16 | 0.06 μm | 5.1 | 0.0 |
| Example 5 | 1 second | Performed | 0.048 | 0.05 | 0.06 μm | 5.0 | 0.0 |
| Example 6 | 1 second | Performed | 0.048 | 0.21 | 0.08 μm | 5.6 | 0.0 |
| Example 7 | 1 second | Performed | 0.048 | 0.21 | 0.04 μm | 5.5 | 0.0 |
| Example 8 | 60 seconds | Performed | 0.033 | 0.21 | 0.06 μm | 5.0 | 0.0 |
| Example 9 | 180 seconds | Performed | 0.015 | 0.21 | 0.06 μm | 5.1 | 0.0 |

From the results shown in Table 2, it is possible to confirm that, in Examples 1 to 9 in which the ΔSFD of the magnetic tape, the logarithmic decrement of the magnetic layer surface, and FIB abrasive diameter are in the ranges described above, the reproduction can be performed at a high SNR (that is, excellent electromagnetic conversion characteristics can be exhibited) and the occurrence of the head element chipping in GTT is prevented. It is thought that, in Comparative Example 6 and Comparative Example 7, a reason of a decrease in SNR compared to that in Examples 1 to 9, is due to an increase in distance between the surface of the magnetic layer and the reproducing element and the occurrence of spacing loss, due to the coarse surface of the magnetic layer, caused by the oxide abrasive present in the magnetic layer in a state where the FIB abrasive diameter significantly exceeds 0.08 μm.

One aspect of the invention is effective in a technical field of a magnetic tape used as a recording medium for archive.

What is claimed is:

1. A magnetic tape comprising:
   a non-magnetic support; and
   a magnetic layer including a ferromagnetic powder and a binding agent on the non-magnetic support,
   wherein ΔSFD in a longitudinal direction of the magnetic tape calculated by Expression 1 is equal to or smaller than 0.50, $$\Delta SFD = SFD_{25°\,C.} - SFD_{-190°\,C.}$$  Expression 1, in Expression 1, the $SFD_{25°\,C.}$ is a switching field distribution SFD measured in the longitudinal direction of the magnetic tape at a temperature of 25° C., and the $SFD_{-190°\,C.}$ is a switching field distribution SFD measured in the longitudinal direction of the magnetic tape at a temperature of −190° C.,
   the magnetic layer includes an oxide abrasive,
   a logarithmic decrement acquired by a pendulum viscoelasticity test performed regarding a surface of the magnetic layer is equal to or smaller than 0.050, and
   an average particle diameter of the oxide abrasive obtained from a secondary ion image obtained by irradiating the surface of the magnetic layer with a focused ion beam is 0.04 μm to 0.08 μm.

2. The magnetic tape according to claim 1,
   wherein the logarithmic decrement is 0.010 to 0.050.

3. The magnetic tape according to claim 1,
   wherein the ΔSFD is 0.03 to 0.50.

4. The magnetic tape according to claim 1,
   wherein the ferromagnetic powder is a ferromagnetic hexagonal ferrite powder.

5. The magnetic tape according to claim 1,
   wherein the oxide abrasive is an alumina powder.

6. The magnetic tape according to claim 1, further comprising:
   a non-magnetic layer including a non-magnetic powder and a binding agent between the non-magnetic support and the magnetic layer.

7. The magnetic tape according to claim 1, further comprising:
   a back coating layer including a non-magnetic powder and a binding agent on a surface of the non-magnetic support opposite to a surface provided with the magnetic layer.

8. A magnetic recording and reproducing device comprising:
   a magnetic tape; and
   a magnetic head,
   wherein the magnetic tape is a magnetic tape comprising:
   a non-magnetic support; and
   a magnetic layer including a ferromagnetic powder and a binding agent on the non-magnetic support,
   wherein ΔSFD in a longitudinal direction of the magnetic tape calculated by Expression 1 is equal to or smaller than 0.50, $$\Delta SFD = SFD_{25°\,C.} - SFD_{-190°\,C.}$$  Expression 1, in Expression 1, the $SFD_{25°\,C.}$ is a switching field distribution SFD measured in the longitudinal direction of the magnetic tape at a temperature of 25° C., and the $SFD_{-190°\,C.}$ is a switching field distribution SFD measured in the longitudinal direction of the magnetic tape at a temperature of −190° C.,
   the magnetic layer includes an oxide abrasive,
   a logarithmic decrement acquired by a pendulum viscoelasticity test performed regarding a surface of the magnetic layer is equal to or smaller than 0.050, and
   an average particle diameter of the oxide abrasive obtained from a secondary ion image obtained by irradiating the surface of the magnetic layer with a focused ion beam is 0.04 μm to 0.08 μm.

9. The magnetic recording and reproducing device according to claim 8, wherein the magnetic head is a magnetic head including magnetoresistive element.

10. The magnetic recording and reproducing device according to claim 8,
wherein the logarithmic decrement is 0.010 to 0.050.

11. The magnetic recording and reproducing device according to claim 8,
wherein the ΔSFD is 0.03 to 0.50.

12. The magnetic recording and reproducing device according to claim 8,
wherein the ferromagnetic powder is a ferromagnetic hexagonal ferrite powder.

13. The magnetic recording and reproducing device according to claim 8,
wherein the oxide abrasive is an alumina powder.

14. The magnetic recording and reproducing device according to claim 8,
wherein the magnetic tape comprises a non-magnetic layer including a non-magnetic powder and a binding agent between the non-magnetic support and the magnetic layer.

15. The magnetic recording and reproducing device according to claim 8,
wherein the magnetic tape comprises a back coating layer including a non-magnetic powder and a binding agent on a surface of the non-magnetic support opposite to a surface provided with the magnetic layer.

\* \* \* \* \*